United States Patent
Osako et al.

(10) Patent No.: US 12,292,923 B2
(45) Date of Patent: May 6, 2025

(54) INFORMATION PROCESSING APPARATUS AND METHOD, AND PROGRAM

(71) Applicant: Sony Group Corporation, Tokyo (JP)

(72) Inventors: Keiichi Osako, Tokyo (JP); Yuhki Mitsufuji, Tokyo (JP)

(73) Assignee: Sony Group Corporation, Tokyo (JP)

( * ) Notice: Subject to any disclaimer, the term of this patent is extended or adjusted under 35 U.S.C. 154(b) by 155 days.

(21) Appl. No.: 17/604,981

(22) PCT Filed: Apr. 14, 2020

(86) PCT No.: PCT/JP2020/016361
§ 371 (c)(1),
(2) Date: May 26, 2022

(87) PCT Pub. No.: WO2020/218075
PCT Pub. Date: Oct. 29, 2020

(65) Prior Publication Data
US 2022/0309097 A1  Sep. 29, 2022

(30) Foreign Application Priority Data

Apr. 26, 2019  (JP) ................. 2019-086006

(51) Int. Cl.
*G06F 16/632* (2019.01)
*G06F 3/14* (2006.01)
(Continued)

(52) U.S. Cl.
CPC .............. *G06F 16/632* (2019.01); *G06F 3/14* (2013.01); *G06F 16/638* (2019.01); *G10L 21/0272* (2013.01); *G10L 25/54* (2013.01)

(58) Field of Classification Search
CPC ........ G06F 16/632; G06F 3/14; G06F 16/638; G10L 21/0272; G10L 25/54
See application file for complete search history.

(56) References Cited

U.S. PATENT DOCUMENTS 7,260,226 B1 *  8/2007  Miura .................... G10H 3/125
2004/0125132 A1 *  7/2004  Katagiri .............. G06F 16/9535
                                                         709/219
(Continued)

FOREIGN PATENT DOCUMENTS

JP  2001134613 A  5/2001
JP  2012-211768 A  11/2012
(Continued)

OTHER PUBLICATIONS

International Search Report and English translation thereof mailed Jun. 2, 2020 in connection with International Application No. PCT/JP2020/016361.

(Continued)

*Primary Examiner* — Etienne P Leroux
*Assistant Examiner* — Oscar Wehovz
(74) *Attorney, Agent, or Firm* — Wolf, Greenfield & Sacks, P.C.

(57) ABSTRACT

An information processing apparatus and method, and a program, which are capable of conducting a search more easily and at a higher speed. The information processing apparatus includes a control unit configured to designate a designated section and a designated sound source of an audio signal including sounds of a plurality of sound sources, and configured to obtain a search result of a sound source signal similar to a signal of the designated sound source, the sound source signal having been searched for on the basis of the signal of the designated sound source in the designated section of the audio signal. The present technology is applicable to the information processing apparatus.

9 Claims, 18 Drawing Sheets

(51) Int. Cl.
*G06F 16/638* (2019.01)
*G10L 21/0272* (2013.01)
*G10L 25/54* (2013.01)

(56) References Cited

U.S. PATENT DOCUMENTS

| | | | |
|---|---|---|---|
| 2006/0215854 A1* | 9/2006 | Suzuki | H04R 3/005 381/98 |
| 2016/0267175 A1* | 9/2016 | Hyun | G06F 3/04842 |
| 2017/0061981 A1 | 3/2017 | Nakadai et al. | |
| 2019/0005935 A1* | 1/2019 | Sasai | G10L 25/51 |
| 2019/0082255 A1* | 3/2019 | Tajiri | H04R 3/005 |

FOREIGN PATENT DOCUMENTS

| | | |
|---|---|---|
| JP | 2013-041128 A | 2/2013 |
| JP | 2013-117688 A | 6/2013 |
| JP | 5732994 B2 | 6/2015 |
| JP | 2017-044916 A | 3/2017 |

OTHER PUBLICATIONS

Higuchi et al., Evaluation of a searching method of an audio file from the piece of the file contaminated by speech signals based on cumulative distance. IEICE Technical Report. Aug. 2014;114(191):19-24.

Yamamura et al., A sound source selection system for a source of simultaneous audio source, a seventy fourth National Conference Collection, 2012, pp. 2 to 588.

International Written Opinion and English translation thereof mailed Jun. 2, 2020 in connection with International Application No. PCT/JP2020/016361.

International Preliminary Report on Patentability and English translation thereof mailed Nov. 4, 2021 in connection with International Application No. PCT/JP2020/016361.

* cited by examiner

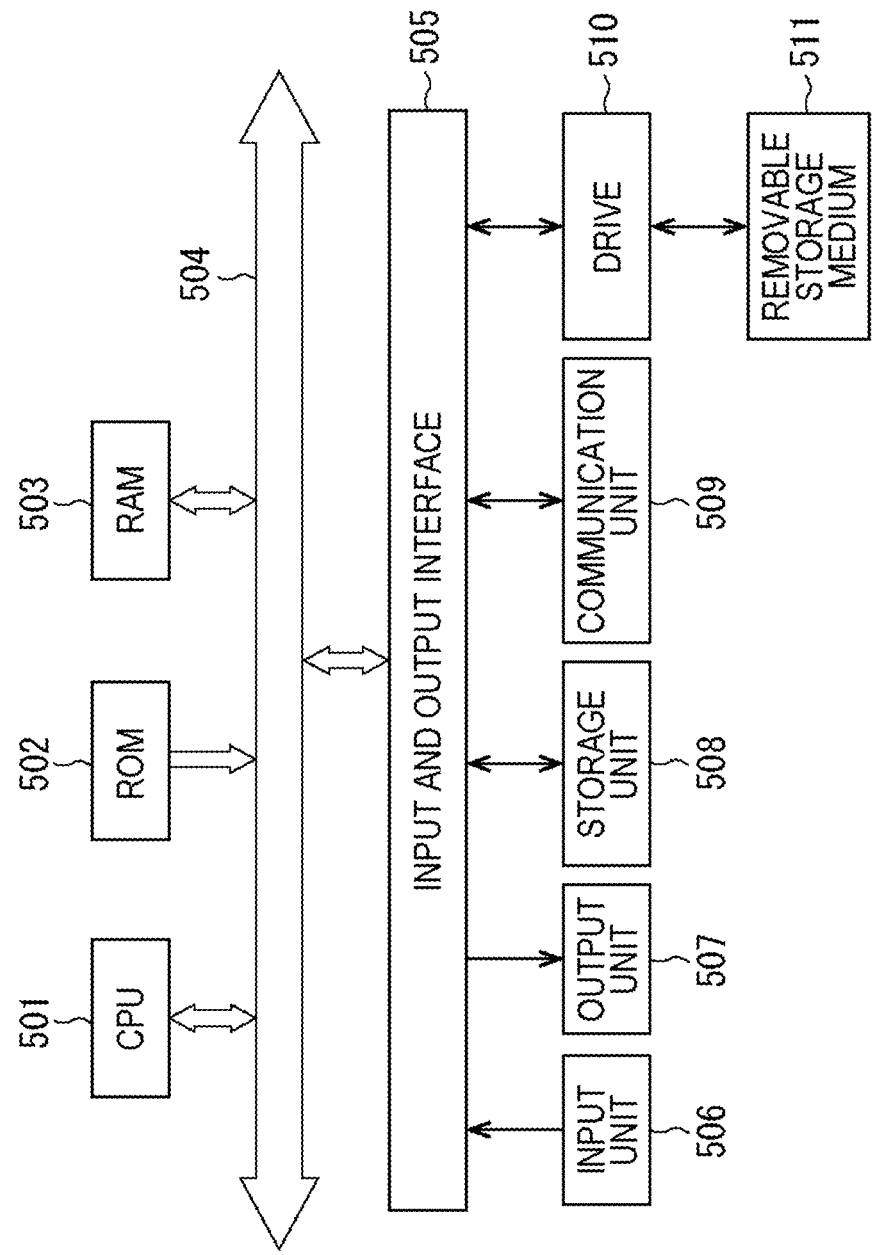

INFORMATION PROCESSING APPARATUS AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/016361, filed in the Japanese Patent Office as a Receiving Office on Apr. 14, 2020, which claims priority to Japanese Patent Application Number JP2019-086006, filed in the Japanese Patent Office on Apr. 26, 2019, each of which is hereby incorporated by reference in its entirety.

TECHNICAL FIELD

The present technology relates to an information processing apparatus and method, and a program, and more particularly, to an information processing apparatus and method, and a program, which enable a search more easily and at a higher speed.

BACKGROUND ART

In a production site of a piece of music, conventionally, a plurality of sound sources that has been individually recorded and sampled beforehand, that is, audio signals are used, and a piece of music is created by combining them together.

In the past, there used to be a small number of sound sources, and creators simply select sound sources such as synthesizers and percussions having different timbres. However, in these years, the number of usable sound sources such as string instruments and sound effects has been dramatically increasing.

For example, in a sound source database, a keyword such as a name of a musical instrument, a name of a piece of equipment such as an amplifier (amplifier), an effector type, or an adjustment parameter, is tagged to each sound source. A creator designates the keyword, and is able to search the sound source database for a desired sound source.

On the other hand, as a method for searching for a sound source, there is also a method for searching the sound source database for a sound source similar to a sound source in hand, by collation (matching).

By using such a method, the creator is able to find out a sound source similar to a piece of music or a recorded sound source owned by the creator oneself, by using the piece of music or the recorded sound source.

For example, as a technique related to collation of an audio signal, there has been proposed a technique in which a tone of a piece of music is converted into a feature amount, and collation with a database is conducted on the basis of the feature amount to identify the piece of music (for example, see Patent Document 1).

In addition, there also has been proposed a technique of conducting pitch detection on humming that has been input by a user through a microphone, and searching a database for a similar piece of music on the basis of a detection result (for example, see Patent Document 2). In this technique, the piece of music that has been obtained by the search is reproduced following the humming of the user.

CITATION LIST

Patent Document

Patent Document 1: Japanese Patent No. 5732994
Patent Document 2: Japanese Patent Application Laid-Open No. 2013-117688

SUMMARY OF THE INVENTION

Problems to be Solved by the Invention

In the above-described techniques, however, it is difficult to search for a signal of a desired sound source simply and at a high speed.

Audio signals of as many as thousands to hundreds of thousands of sound sources are usually stored in the sound source database. Hence, it will take a long time for a creator or the like for a work of finding out a similar sound source from the stored ones on the basis of a keyword.

In this case, in a case where the creator or the like that conducts a search has knowledge about a connection between a desired sound source and each keyword, sound sources to be candidates can be narrowed down to some extent.

Specifically, for example, in a case where the creator or the like desires to find out a predetermined guitar sound by a search, and the creator or the like has knowledge about a connection between the timbre of the guitar and each keyword, the creator or the like is able to narrow down the sound sources to be candidates.

The creator or the like, however, does not have sufficient knowledge to designate an appropriate keyword for all sound sources that the creator or the like desires to use. Hence, it is often difficult to find out a sound source that matches an image in mind of the creator or the like.

Moreover, there are various timbres in the sound of a guitar or the like, and even if candidates can be narrowed down to some extent, the effect of improving the search efficiency is limited.

Furthermore, in a case where a desired sound source is searched for by collation with a sound source database using a piece of music or the like in hand of a creator or the like, the piece of music or the like in hand often includes not only the sound of the desired sound source but also sounds of various sound sources.

Use of such a mixed sound of a plurality of sound sources largely degrades accuracy in collation with the sound source database, and it is difficult to find out a sound source that matches an image in mind of the creator or the like.

Specifically, for example, in the technology described in Patent Document 1, a tone component of a piece of music is extracted as a feature amount, but most of the tone components of the piece of music are main melodies of vocals and music melodies.

Therefore, for example, even in a case where the technology described in Patent Document 1 is used for collation with the sound source database, it is difficult to find out a sound source of a guitar or the like other than the main melodies of vocals and music melodies, by using a piece of music or the like in hand.

Moreover, in this case, it is difficult to collate the timbre of the guitar and the like. Hence, the creator or the like has to reproduce the sound source for every sound source that has been obtained by the search and confirm whether the sound source matches the timbre that is an image in mind of the creator or the like.

In addition, for example, the technology described in Patent Document 2 can be used to search for a sound source of a melody similar to the humming that has been input.

In the technique described in Patent Document 2, however, a sound source of a harmony or a unique timbre cannot be searched for, and in addition, humming input may be difficult depending on the sound source, such as percussion, sound effects, and environmental sounds.

The present technology has been made in view of the above circumstances, and has an object to enable a search more easily and at a higher speed.

Solutions to Problems

An information processing apparatus according to one aspect of the present technology includes a control unit configured to designate a designated section and a designated sound source of an audio signal including sounds of a plurality of sound sources, and configured to obtain a search result of a sound source signal similar to a signal of the designated sound source, the search result of the sound source signal having been searched for on the basis of the signal of the designated sound source in the designated section of the audio signal.

An information processing method or a program according to one aspect of the present technology includes a step of designating a designated section and a designated sound source of an audio signal including sounds of a plurality of sound sources, and obtaining a search result of a sound source signal similar to a signal of the designated sound source, the search result of the sound source signal having been searched for on the basis of the signal of the designated sound source in the designated section of the audio signal.

According to one aspect of the present technology, a designated section and a designated sound source of an audio signal including sounds of a plurality of sound sources are designated, and a search result of a sound source signal similar to a signal of the designated sound source is obtained, the search result of the sound source signal having been searched for on the basis of the signal of the designated sound source in the designated section of the audio signal.

BRIEF DESCRIPTION OF DRAWINGS

FIG. 18 is a diagram illustrating a configuration example of a computer.

MODE FOR CARRYING OUT THE INVENTION

Figure 1:
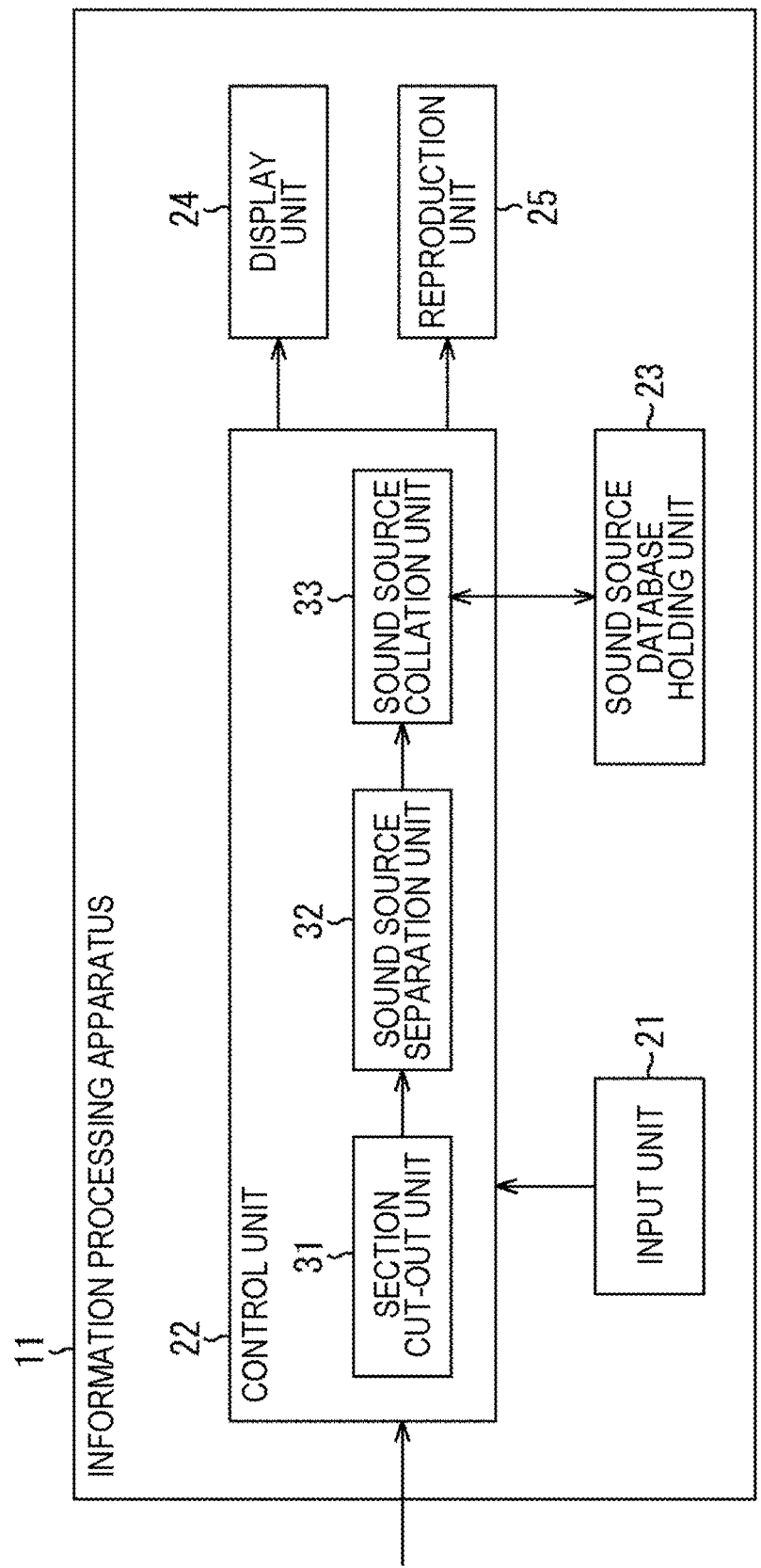
FIG. 1 is a diagram illustrating a configuration example of an information processing apparatus.

Hereinafter, embodiments to which the present technology is applied will be described with reference to the drawings.

First Embodiment

Regarding Present Technology

In the present technology, sound source separation is conducted using a piece of music including sounds of a sound source of a musical instrument or the like that is an image in mind of a creator or the like, so that a search of the sound source database for a signal of a sound source similar to the sound source can be conducted easily and at a high speed.

That is, in the present technology, an audio signal of a piece of music (hereinafter, also referred to as an input audio signal) including the sound source or the recorded sound, which is an image in mind of the creator or the like who is a user, and which the user desires to search for, is used for collation with sound source signals of a plurality of sound sources constituting a sound source database.

In this situation, from the input audio signal that has been designated by the user, an audio signal of a desired sound source, which the user desires as a search target, is extracted by the sound source separation, and is used for the collation.

The sound source database includes: sound source signals, which are audio signals of a plurality of sound sources such as, for example, a guitar sound, a sound effect, and an environmental sound; and metadata that is information regarding each sound source and that is associated with each sound source signal.

For example, the sound source signal constituting the sound source database is short-track data of about several seconds for reproducing the sound of one sound source, such as a guitar sound.

In addition, the metadata is information indicating a type of sound source such as a name of a musical instrument, a name of a piece of equipment such as an amplifier used to amplify the sound of the sound source, a type of effector used to generate the sound source, a chord name (a harmony name), an adjustment parameter such as a timbre, and the like. The metadata can also be used for a keyword search of the sound source.

A creator who is a user is in daily contact with various pieces of music, and it is easy to prepare a piece of music including a sound source that the creator desires to use.

Therefore, in a case where the creator is able to use the piece of music or the like including the desired sound source, and to search for the sound source signal of the sound source similar to the desired sound source easily and at a high speed, a large improvement in the work efficiency is enabled.

Furthermore, the sound source to be a search target is not limited to a musical instrument, and may be any sound (sound source) present in an audio signal that has been obtained by recording daily life or environmental sounds.

That is, the creator is able to search the sound source database for a sound similar to any sound that the creator desires to use.

In a case where there is a sound that the creator desires to use, usually the creator has to install a microphone near a desired sound source to individually sample and record the sound in order to record only the desired sound, that is, to prevent an unnecessary sound from entering.

The sound source separation to be conducted as in the present technology, however, eliminates the need for the recording work for preventing entry of other sounds. Therefore, a more efficient production environment of a piece of music can be offered.

Note that in the following, as a specific example, a description will be given with regard to a case where the sound to be a search target is a guitar sound. However, the sound to be a search target may be a sound of any sound source.

For example, a piece of music including the guitar sound that is a search target includes sounds of bass, drums, synthesizers, vocals, and the like, in addition to the guitar sound. In the present technology, a desired guitar sound is extracted by the sound source separation, and collation between the extracted guitar sound and the sound source database is conducted.

<Configuration Example of Information Processing Apparatus>

So, hereinafter, a more specific embodiment to which the present technology is applied will be described.

FIG. 1 is a diagram illustrating a configuration example of an information processing apparatus, according to an embodiment, to which the present technology is applied.

An information processing apparatus 11 illustrated in FIG. 1 includes an input unit 21, a control unit 22, a sound source database holding unit 23, a display unit 24, and a reproduction unit 25.

The input unit 21 includes, for example, a mouse, a keyboard, a switch, a button, a touch panel, and the like, and supplies the control unit 22 with a signal in accordance with an operation of a user such as a creator.

The control unit 22 controls the entirety of the information processing apparatus 11.

For example, the control unit 22 controls displaying of various images (screens) on the display unit 24, and controls reproduction of sounds on the reproduction unit 25.

In addition, the control unit 22 designates a section to be cut out with respect to an input audio signal or a sound source to be extracted from the section, in response to a signal from the input unit 21, and causes each unit of the control unit 22 to operate to conduct collation with a sound source database, and obtains a collation result.

The control unit 22 includes a section cut-out unit 31, a sound source separation unit 32, and a sound source collation unit 33.

The section cut-out unit 31 to the sound source collation unit 33 are achieved, for example, by the control unit 22 executing a program constituting music production software (desk top music (DTM) software).

The section cut-out unit 31 cuts out a section that has been designated by the control unit 22 (hereinafter, also referred to as a designated section) to be a search target, from an input audio signal that is an audio signal of a piece of music or the like that has been supplied to the control unit 22, sets to be a target section signal, and supplies the sound source separation unit 32 with the target section signal.

Here, the input audio signal includes a sound of one or a plurality of sound sources including at least a sound source desired to be searched for.

The sound source separation unit 32 conducts sound source separation on a target section signal that has been supplied from the section cut-out unit 31 to separate a signal of a desired sound source that has been designated by the control unit 22 (hereinafter, also referred to as a designated sound source), and supplies the signal to the sound source collation unit 33.

Note that hereinafter, the signal that has been separated by the sound source separation is also referred to as a separation signal. In the sound source separation unit 32, the separation signal of the designated sound source in the designated section of the input audio signal is obtained by the sound source separation.

The sound source collation unit 33 collates the separation signal that has been supplied from the sound source separation unit 32 with a sound source signal of each sound source in the sound source database held in the sound source database holding unit 23.

The sound source database holding unit 23 includes a storage device, for example, a memory or the like, and holds a sound source database in which a sound source signal that is an audio signal of each of a plurality of sound sources and metadata are associated with each other. The sound source database holding unit 23 supplies the sound source signal and the metadata in the sound source database to the sound source collation unit 33, as necessary.

The display unit 24 includes, for example, a liquid crystal display panel or the like, and displays various images such as a display screen of the DTM software in accordance with the control of the control unit 22.

The reproduction unit 25 includes, for example, a speaker or the like, and outputs a sound on the basis of an audio signal such as a sound source signal that has been supplied from the control unit 22.

Note that the input unit 21, the sound source database holding unit 23, the display unit 24, and the reproduction unit 25 may be provided in the information processing apparatus 11, or may be provided outside the information processing apparatus 11.

<Description of Sound Source Search Process>

Next, an operation of the information processing apparatus 11 will be described.

That is, hereinafter, a sound source search process performed by the information processing apparatus 11 will be described with reference to a flowchart in FIG. 2.

In step S11, the control unit 22 reads an input audio signal and displays a waveform in accordance with a signal that has been supplied from the input unit 21.

Figure 3:
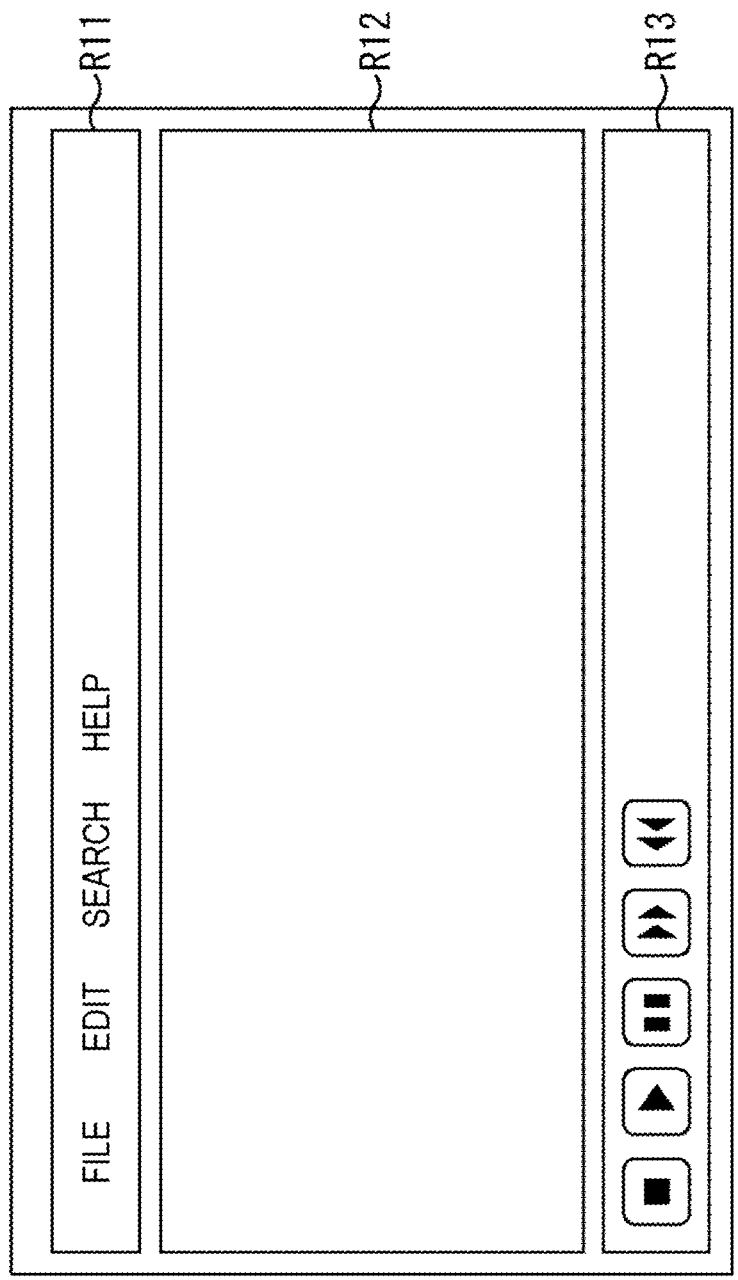
FIG. 3 is a diagram illustrating a display screen example.

That is, for example, when the DTM software is activated, the control unit 22 causes the display unit 24 to display a display screen illustrated in FIG. 3.

In an example of FIG. 3, the display screen includes a menu display area R11, a waveform display area R12, and a reproduction system button display area R13.

For example, buttons for performing various types of processes such as a sound source search are displayed in the menu display area R11, and a waveform of the input audio signal that has been read is displayed in the waveform display area R12. In addition, in the reproduction system button display area R13, buttons for reproducing a sound source and the like are displayed.

A user operates the input unit 21, with such a display screen displayed on the display unit 24, to designate, for example, a file of a piece of music or the like including a sound source that the user desires to search for or drop the file of a piece of music or the like including the sound source that the user desires to search for in the waveform display area R12 so as to instruct reading.

Then, in accordance with the signal that has been supplied from the input unit 21, the control unit 22 reads a file of the piece of music or the like that has been designated by the user, that is, an audio signal of the piece of music or the like, as an input audio signal, and supplies the section cut-out unit 31 with the input audio signal.

Further, the control unit 22 instructs the display unit 24 to display the waveform (temporal waveform) of the input audio signal on the basis of the input audio signal that has been read.

Figure 4:
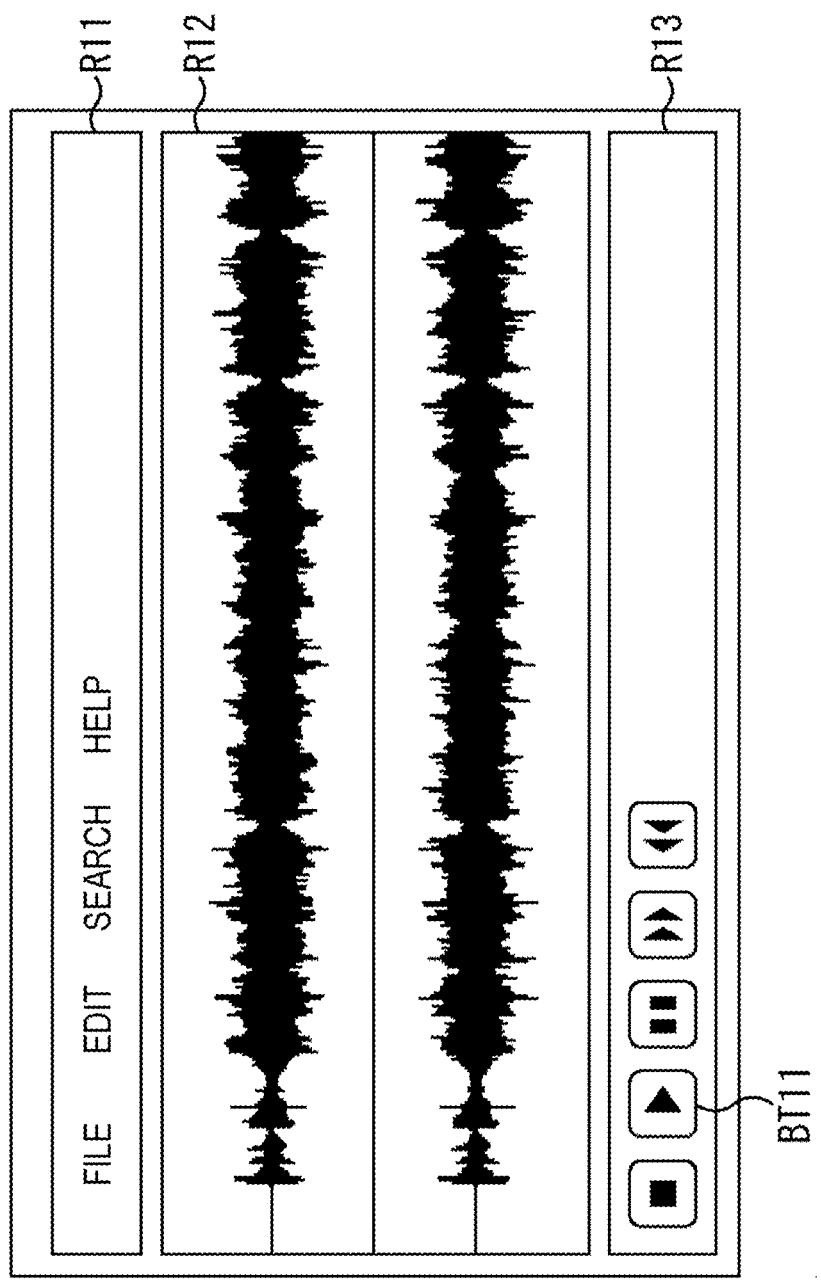
FIG. 4 is a diagram illustrating a display screen example.

Then, the display unit 24 displays the waveform of the input audio signal in accordance with an instruction from the control unit 22. With such a configuration, the display screen displayed on the display unit 24 is updated as illustrated in FIG. 4, for example. Note that in FIG. 4, parts corresponding to those in the case of FIG. 3 are applied with the same reference numerals, and the descriptions will be omitted as appropriate.

In an example illustrated in FIG. 4, the temporal waveforms of the respective signals of an L channel and an R channel that have been read as the input audio signals are displayed in the waveform display area R12. In particular, in the waveform display area R12, the horizontal direction represents a time direction in the drawing.

The user operates the input unit 21, and operates a reproduction button BT11 provided in the reproduction system button display area R13 to be able to reproduce the sound based on the input audio signal. Therefore, the user is able to actually listen to the sound and confirm the sound that the user desires as the search target.

In this situation, when the reproduction button BT11 is operated, the control unit 22 supplies the input audio signal to the reproduction unit 25 in response to the signal supplied from the input unit 21, and reproduces the sound of the input audio signal.

Figure 2:
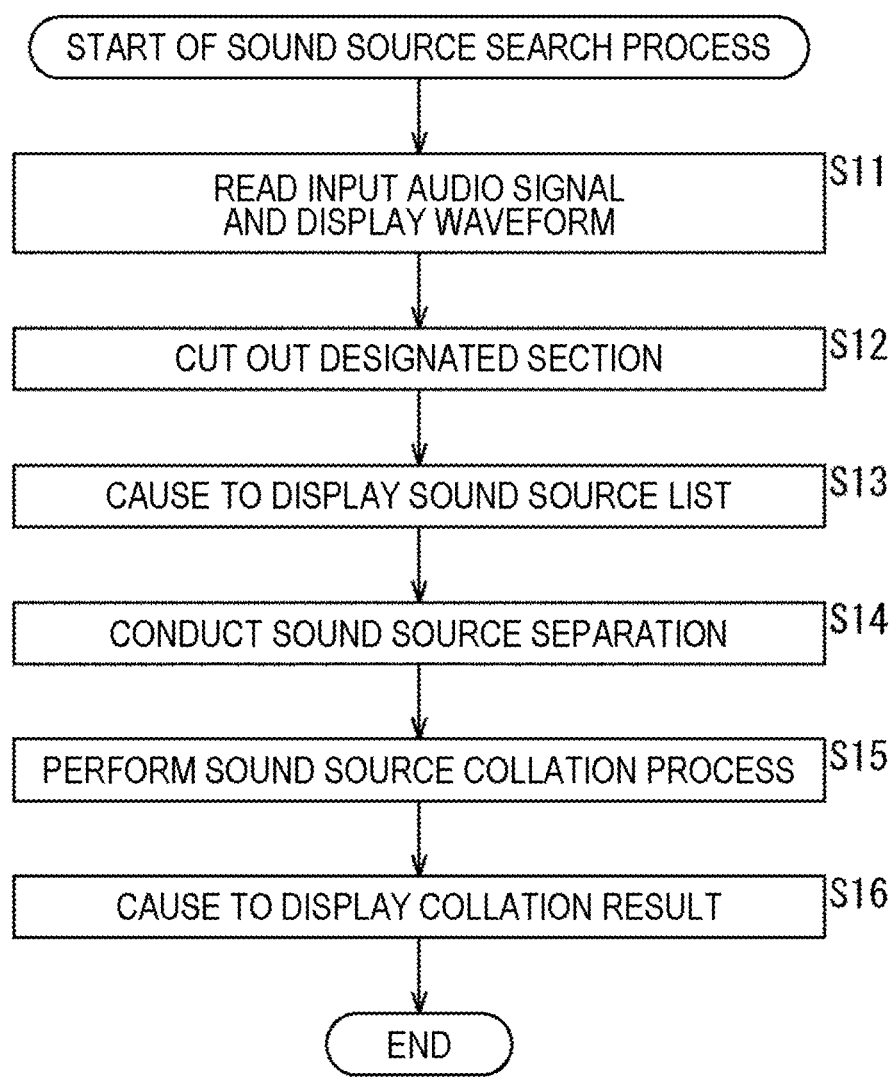
FIG. 2 is a flowchart for describing a sound source search process.

Returning to the description of the flowchart of FIG. 2, in step S12, the section cut-out unit 31 cuts out the designated section with respect to the input audio signal that has been supplied.

For example, when the input audio signal is read, the user operates the input unit 21 while listening to the sound of the input audio signal, and designates a section including the sound of a desired sound source from all sections of the input audio signal, as a designated section to be a search target.

Specifically, for example, the user operates the mouse as the input unit 21, and drags a desired section of the waveform of the input audio signal that is being displayed in the waveform display area R12 to designate the designated section.

Figure 5:
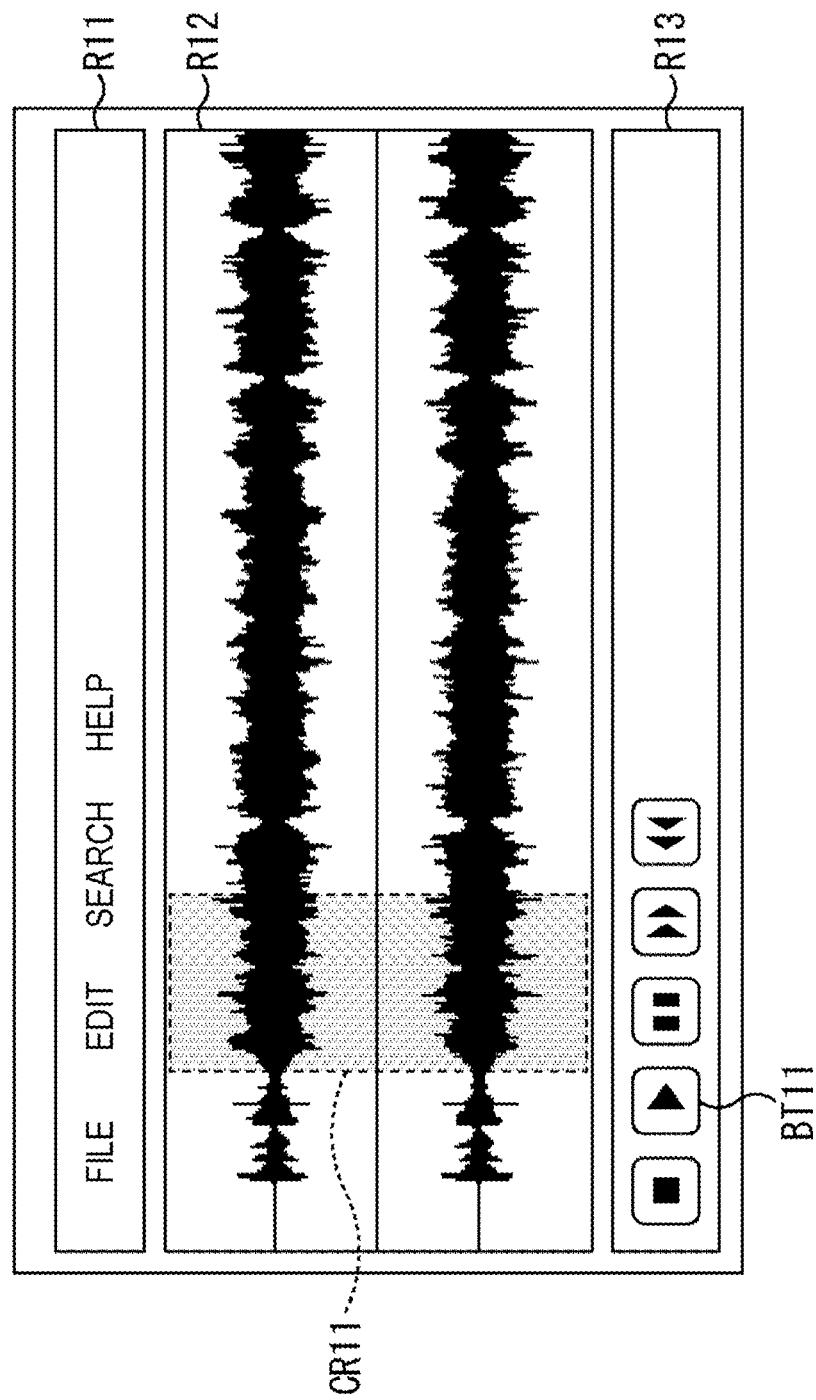
FIG. 5 is a diagram illustrating a display screen example.

The control unit 22 controls the display unit 24 on the basis of the signal indicating the designated section that has been supplied from the input unit 21, and updates the display screen as illustrated in FIG. 5, for example. Note that in FIG. 5, parts corresponding to those in the case of FIG. 4 are applied with the same reference numerals, and the descriptions will be omitted as appropriate.

In an example of FIG. 5, a section CR11, which is a part in the waveform display area R12, is set as the designated section. Such a part, which is the section CR11, is displayed in a color different from the other parts, so that the user is able to instantaneously grasp that the section CR11 is in a selected state, that is, designated as the designated section.

Note that the designation of the designated section is not limited to the operation with the mouse as the input unit 21, and may be conducted by an input operation with a keyboard as the input unit 21, a designation operation with a touch panel as the input unit 21, or the like.

Further, when a signal indicating the designated section is supplied from the input unit 21 to the control unit 22 in response to a user's operation, the control unit 22 designates the designated section for the section cut-out unit 31 on the basis of the signal that has been supplied from the input unit 21.

In response to the designation of the designated section by the control unit 22, the section cut-out unit 31 cuts out a signal of the designated section in the input audio signal to set as a target section signal. The section cut-out unit 31 supplies the sound source separation unit 32 with the target section signal that has been obtained in this manner.

In step S13, the control unit 22 controls the display unit 24 to display a sound source list on the display screen.

Figure 6:
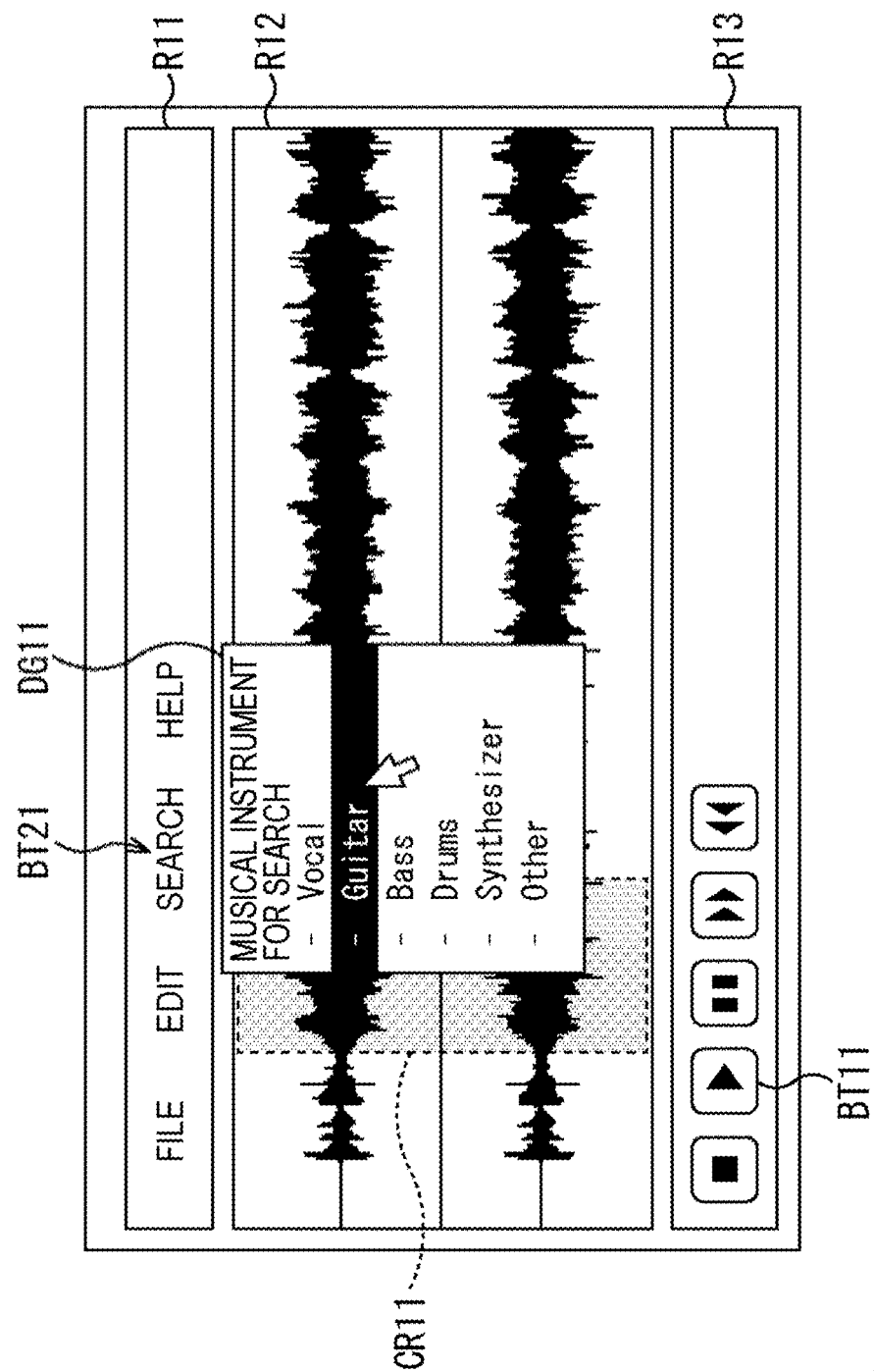
FIG. 6 is a diagram illustrating a display screen example.

For example, as illustrated in FIG. 6, in a state where the display screen is being displayed on the display unit 24, when the user operates the input unit 21 and operates a search button BT21 provided in the menu display area R11, a dialog DG11, which is a list of musical instruments (sound sources) to be candidates for the search target, is displayed. Note that in FIG. 6, parts corresponding to those in the case of FIG. 5 are applied with the same reference numerals, and the descriptions will be omitted as appropriate.

In an example of FIG. 6, in the dialog DG11, a list of musical instruments, in which items indicating a plurality of preset musical instruments are arranged, is displayed as the sound source list. These musical instruments indicated by the sound source list include sound sources to be candidates for the designated sound source, more specifically, types of sound sources.

For example, the user operates the input unit 21, and designates an item, in which characters "Guitar" indicating the guitar are displayed, so as to be able to designate the guitar as the designated sound source.

Note that although a case where the musical instruments (the sound sources) listed in the dialog DG11 are determined beforehand is described here, the musical instruments specified by an analysis process with respect to the input audio signal may be listed in the dialog DG11.

In such a case, when the search button BT21 is operated, the control unit 22 performs the analysis process on the target section signal that has been obtained by the section cut-out unit 31, and identifies (specifies) the type of musical instrument, the sound of which is included in the designated section.

Then, the control unit 22 controls the display unit 24 to display a list of one or a plurality of musical instruments that has been obtained as an identification result, in the dialog DG11 as the sound source list.

The analysis process on the target section signal, that is, a musical instrument identification process may be any method.

As a method for identifying a musical instrument, the sound of which is included in an audio signal, for example, a method described in "Tetsuro Kitahara, Masataka Goto, Kazunori Komatani, Tetsuya Ogata, and Hiroshi G. Okuno, "Instrument Identification in Polyphonic Music: Feature Weighting to Minimize Influence of Sound Overlaps," EURASIP Journal on Advances in Signal Processing, Special Issue on Music Information Retrieval based on Signal Processing, Vol. 2007, No. 51979, pp. 1-15, 2007." or the like can be adopted.

Other than that, the metadata of the input audio signal or the like may be used in the display of the sound source list.

For example, it is assumed that information indicating "rock", which is the type of a piece of music, is included as metadata of the input audio signal.

In such a case, the control unit 22 may cause information indicating "vocal", "guitar", "bass", "drum", and "synthesizer", which are types of the sound sources (the musical instruments) that have been set beforehand for the type "rock" to be listed as a sound source list in the dialog DG11.

Returning to the description of the flowchart in FIG. 2, when the user operates the input unit 21 to perform an operation of designating a desired sound source (a musical instrument) as a search target from the sound source list so as to be a designated sound source, a signal in accordance with the user's operation is supplied from the input unit 21 to the control unit 22.

Then, in response to the signal that has been supplied from the input unit 21, the control unit 22 designates the designated sound source for the sound source separation unit 32.

In step S14, the sound source separation unit 32 conducts sound source separation in accordance with the designated sound source that has been designated by the control unit 22 on the target section signal that has been supplied from the section cut-out unit 31, and separates the separation signal of the designated sound source from the target section signal.

In the sound source separation, for example, a neural network that separates signals of sound sources such as some musical instruments including a designated sound source is used as a sound source separator, and a separation signal for every one or a plurality of sound sources including the designated sound source is separated. With such a configuration, the separation signal of the designated sound source, that is, the separation signal including only the sound of the designated sound source is obtained.

The sound source separation is described in detail in, for example, "Naoya Takahashi and Yuki Mitsufuji, "Multi-scale Multi-band DenseNets for Audio Source Separation," IEEE Workshop on Applications of Signal Processing to Audio and Acoustics (WASPAA), 2017", or the like.

In addition, here, an example of using the sound source separation as a technique of extracting the separation signal of the designated sound source from the target section signal is described. However, without limiting to this, known techniques such as musical instrument extraction, voice extraction, and event sound extraction may be used.

The sound source separation unit 32 supplies the sound source collation unit 33 with the separation signal of the designated sound source that has been obtained as a result of the sound source separation.

Note that here, an example of supplying the sound source collation unit 33 with the separation signal itself of the designated sound source will be described. However, a feature amount obtained from the separation signal of the designated sound source may be supplied to the sound source collation unit 33, and collation with the sound source database may be conducted on the basis of the feature amount.

In such a case, the output of the sound source separation in the sound source separation unit 32 may be the feature amount of the designated sound source, or the feature amount may be calculated from the separation signal in the sound source separation unit 32 or the sound source collation unit 33.

In step S15, the sound source collation unit 33 performs a sound source collation process of collating the separation signal of the designated sound source that has been supplied from the sound source separation unit 32 with the sound source database held in the sound source database holding unit 23.

Specifically, for example, the sound source collation unit 33 calculates a square error minimum distance in a waveform level between the sound source signal and the separation signal of the designated sound source for the sound source signal of each sound source constituting the sound source database.

Then, the sound source collation unit 33 sequentially selects a predetermined number of sound sources, more specifically, sound source signals of the sound sources, in ascending order of the square error minimum distance from the plurality of sound sources in the sound source database, and obtains information indicating the sound source that has been selected as a collation result.

It can be said that the square error minimum distance calculated for every combination of each sound source in the sound source database and the designated sound source indicates a degree of similarity between the sound of the designated sound source and the sound of the sound source in the sound source database.

Therefore, it can be said that the process of selecting a sound source having a small square error minimum distance to be performed as the sound source collation process is a process of searching for a sound source signal similar to the separation signal of the designated sound source on the basis of the separation signal of the designated sound source.

That is, it can be said that the sound source collation process is a process of collating the separation signal of the designated sound source with each of the plurality of sound source signals constituting the sound source database so as to search for a sound source signal similar to the separation signal of the designated sound source from among the plurality of sound source signals constituting the sound source database.

Note that here, a description will be given with regard to an example in which the number of the sound sources obtained as a collation result, that is, the number of the sound sources similar to the designated sound source is set beforehand. However, all the sound sources each having a square error minimum distance equal to or less than a predetermined threshold may be selected, and information indicating the sound sources that have been selected may be set as the collation result.

Further, for example, the sound source collation process may be performed on the basis of the feature amount that has been obtained from the separation signal of the designated sound source.

For example, the feature amount obtained from the separation signal may be any type, such as a time-frequency signal of the separation signal or an amplitude spectrum, a pitch, a tone, or a spectral envelope of a frame-divided separation signal. In addition, the feature amount may be a scalar value or a vector value (a feature amount vector).

Specifically, for example, it is assumed that the time-frequency signal of the separation signal is supplied to the sound source collation unit 33, as the feature amount of the separation signal of the designated sound source.

In such a case, the sound source collation unit 33 evaluates a temporal variation and a harmonic structure in a narrow band of each sound source and the designated sound source on the basis of the feature amount of the sound source signal of each sound source in the sound source database and the feature amount of the designated sound source so as to collate each sound source with the designated sound source, and obtains a collation result on the basis of an evaluation value that has been obtained.

Note that the feature amount of the sound source signal of each sound source in the sound source database may be calculated by the sound source collation unit 33, or may be calculated beforehand and stored in association with the sound source signal of each sound source in the sound source database.

In addition, here, the description has been given with regard to the example of conducting the collation using the separation signal itself and the example of conducting the collation on the basis of the feature amount. However, without limiting to this, the collation between each sound source in the sound source database and the designated sound source may be conducted by any other method.

In the general collation process, the signal itself of the sound source is often used. Therefore, in a case where the separation signal itself of the designated sound source is used in the sound source collation process, there is an advantage that an existing sound source database or sound source collation processing block can be used as it is without a change.

That is, a module constituting the sound source separation unit 32 and a module constituting the sound source collation unit 33 can be made independent of each other. This configuration enables improvements in mobility and portability of the system.

On the other hand, in a case where the feature amount of the designated sound source is output from the sound source separation unit 32 as a result of the sound source separation, and the sound source collation process is performed on the basis of the feature amount, there is an advantage that the sound source collation process can be performed at a high speed.

That is, in this case, it is necessary to obtain the feature amount of each sound source signal beforehand and store the feature amount in association with the sound source signal in the sound source database. However, the necessary feature amount is obtained at the start of the sound source collation process, so the collation result is obtainable in a small processing time. With such a configuration, the waiting time of the user can be reduced.

Moreover, in a case where an output of the sound source separation is a feature amount, time-frequency conversion for calculating the feature amount in the sound source separation unit 32 or the sound source collation unit 33, its inverse conversion, or the like does not have to be conducted. Therefore, a redundant process is reduced, and the collation result is obtainable at a higher speed.

In any method, the sound source collation unit 33 collates with the sound source (the sound source signal) in the sound source database on the basis of the sound source separation result that has been obtained by the sound source separation unit 32. Accordingly, only the component of the sound source that the user desires to search for is used for performing the sound source collation process.

Therefore, in the sound source collation process, a sound having a timbre, a harmony, a tone, or the like close to the sound of the designated sound source is obtained as the collation result (a search result). That is, the sound source signal of the sound source that the user desires, such as a sound source signal having a similar timbre or the like to that of the designated sound source, is obtainable as the collation result.

Figure 7:
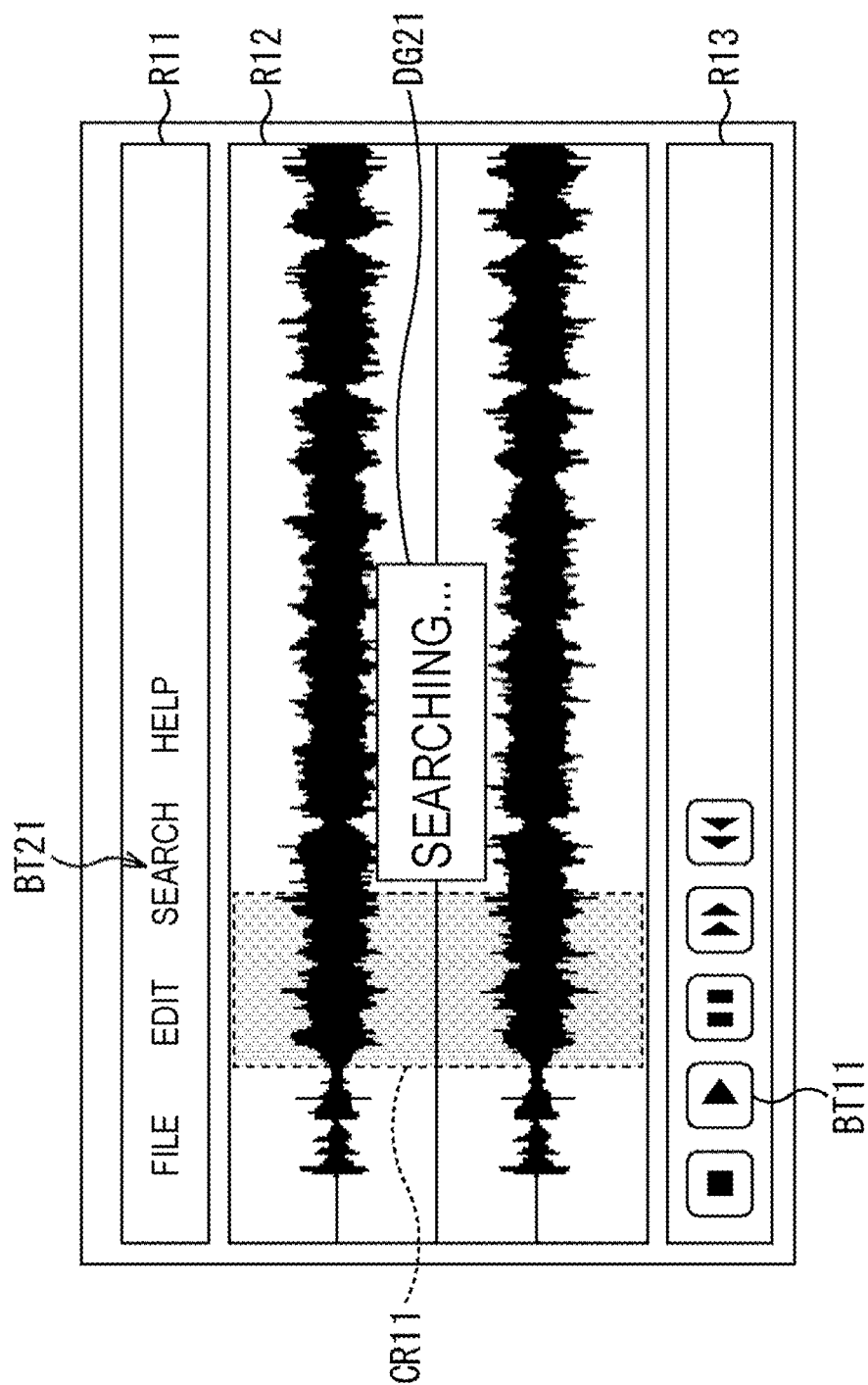
FIG. 7 is a diagram illustrating a display screen example.

Furthermore, the control unit 22 controls the display unit 24 to display, for example, a dialog DG21 illustrated in FIG. 7, while the sound source collation unit 33 is performing the sound source collation process, that is, while the sound source similar to the designated sound source is being searched for. Note that in FIG. 7, parts corresponding to those in the case of FIG. 6 are applied with the same reference numerals, and the descriptions will be omitted as appropriate.

In an example of FIG. 7, the dialog DG21, in which a character message "searching" is displayed to notify the user that the sound source is being searched for, that is, the search is being processed, is displayed at the center of the display screen. Therefore, the user is able to instantaneously grasp that the search process is in progress by viewing the dialog DG21.

Returning to the description of the flowchart in FIG. 2, when the collation result (the search result) is obtained in the sound source collation unit 33, the control unit 22 obtains the collation result from the sound source collation unit 33.

In step S16, the control unit 22 controls the display unit 24 to display the collation result that has been obtained by the sound source collation process in step S15 on the display screen, and the sound source search process ends. That is, the control unit 22 controls the display of the collation result on the display unit 24.

Figure 8:
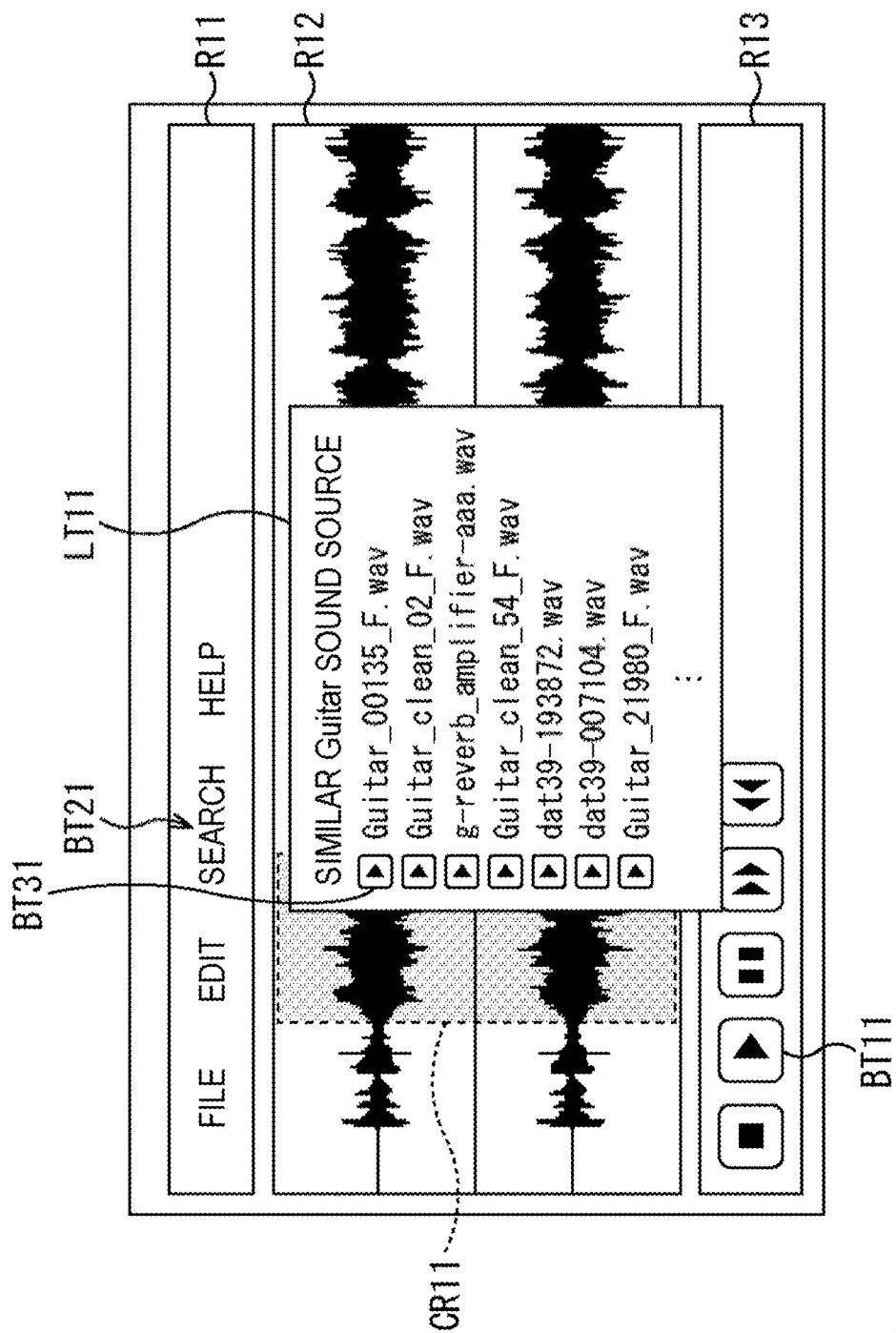
FIG. 8 is a diagram illustrating a display screen example.

For example, when the control unit 22 obtains the collation result that has been obtained in the sound source collation process in step S15 from the sound source collation unit 33, the control unit 22 causes the display unit 24 to display a similar sound source list LT11 illustrated in FIG. 8 on the basis of the collation result. In other words, the similar sound source list LT11 is displayed as the collation result.

Note that in FIG. 8, parts corresponding to those in the case of FIG. 7 are applied with the same reference numerals, and the descriptions will be omitted as appropriate.

In an example of FIG. 8, the similar sound source list LT11 is displayed to be superimposed on the display screen illustrated in FIG. 5. In the similar sound source list LT11, file names respectively indicating the sound source signals of the sound sources in the sound source database are arranged and displayed in descending order in the degree of similarity to the designated sound source, that is, for example, in ascending order in the square error minimum distance that has been described above, from the top in a downward direction in the drawing.

Further, reproduction buttons for respectively reproducing the sound source signals of the file names are displayed on the left sides of the respective file names in the drawing.

Therefore, the user is able to operate the reproduction button to actually listen to and confirm the sound of each sound source, and to easily select the sound source to be used.

Specifically, for example, when the user operates the input unit 21 and operates a reproduction button BT31, a signal in accordance with the user's operation is supplied from the input unit 21 to the control unit 22.

Then, the control unit 22 reads the sound source signal having a file name "Guitar_00135_F.wav" from the sound source database holding unit 23 in response to the signal from the input unit 21, supplies the reproduction unit 25 with the sound source signal, and causes the reproduction unit 25 to reproduce a sound based on the sound source signal.

In addition, when the user operates the input unit 21 to designate a file name of a desired sound source signal in the similar sound source list LT11 and gives an instruction of developing a file (a sound source signal) having such a file name on the DTM software, the control unit 22 reads the sound source signal that has been designated from the sound source database holding unit 23 in accordance with the instruction. In this manner, when the sound source signal of the desired sound source is read and developed on the DTM software, the sound source search process ends.

Note that in FIG. 8, the description has been given with regard to the example in which the similar sound source list LT11 in which the file names of the sound source signals are arranged in descending order in the degree of similarity is displayed as the collation result. However, without limiting to this, for example, only the file name of the sound source signal having the highest degree of similarity may be displayed as the collation result.

Figure 9:
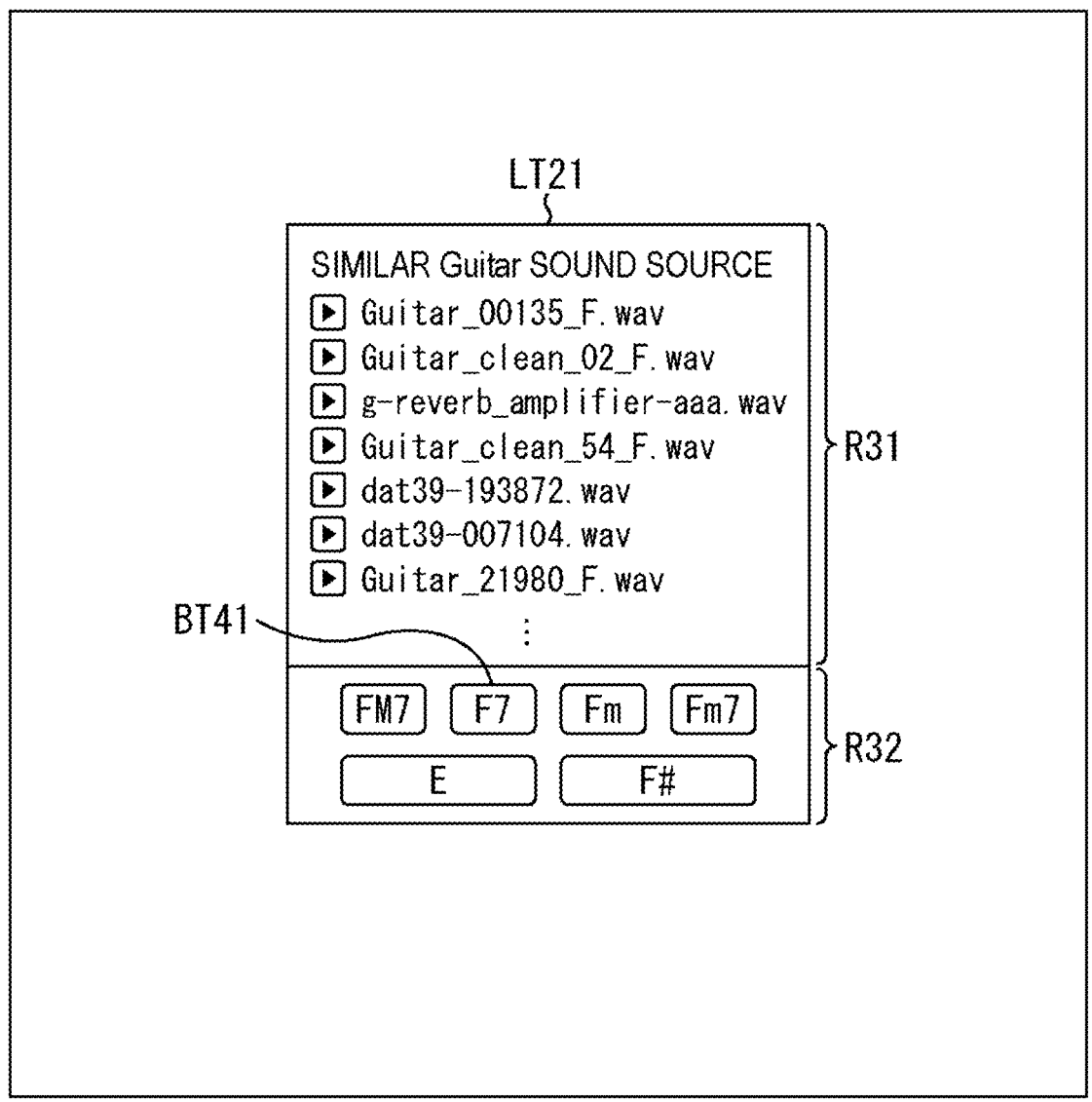
FIG. 9 is a diagram illustrating a display screen example.

Other than that, for example, a similar sound source list LT21 illustrated in FIG. 9 may be displayed on the display unit 24, as a collation result (a search result).

In this example, the similar sound source list LT21 includes a list display area R31, in which the file names of the sound source signals that have been obtained as the collation result are displayed, and a link display area R32, in which link buttons to other related sound source signals are displayed.

The user operates the input unit 21 to operate the link button in the link display area R32, so that the user is able to easily access a sound of the sound source (the musical instrument), which is the same with the sound source signal that has been obtained as the collation result, and which is a sound source signal having a chord, a tone, a scale, or the like different from those displayed in the similar sound source list LT21. In other words, it is possible to easily access files that are the same in timbre but are different in chord, tone, scale, and the like.

Therefore, the user is able to easily access the file (the sound source signal) of the related sound source and easily find the file of the sound source that the user desires to use.

Specifically, in an example of FIG. 9, the file names of the files of sounds (the sound source signals) when a chord "F" is played with various guitars are displayed in the list display area R31 as the search results (the collation results) of the sound sources similar to the designated sound source.

In this situation, for example, it is assumed that the user operates a link button BT41 in which characters "F7" are marked in the link display area R32.

Then, the control unit 22 controls the display unit 24 to further display, on the display unit 24, a list (list) of files of the sounds when the chord "F7" is played with the same guitar with those of the files of the respective file names displayed in the list display area R31, and reproduction buttons of those files.

Other than that, for example, when the user operates the link button BT41 with the file name "Guitar_00135_F.wav" designated in the list display area R31, the control unit 22 may display, on the display unit 24, the file name of the file of the sound when the chord "F7" is played with the same guitar with that of the file of the file name "Guitar_00135_F.wav".

As described above, the information processing apparatus 11 conducts the sound source separation on the input audio signal, and conducts collation with the sound source database using the sound source separation result.

The collation with the sound source database using the sound source separation result in this manner enables the search to be conducted more easily and at a higher speed.

That is, the user designates only a musical instrument or the like that the user desires to search for, so that the user is able to find out a desired sound source easily and at a high speed, more specifically, a sound source signal of a desired sound source, without reproducing each sound source signal one by one in the sound source database.

In particular, without the knowledge of a connection or the like between a sound source that the user desires to search for and a keyword or the like, the user is able to easily conduct the search only by designating a musical instrument or the like.

Moreover, in the information processing apparatus 11, the input audio signal is separated into the signals of the individual sound sources by the sound source separation. Therefore, a search in unit of a sound source, that is, in unit of a musical instrument is achievable, which has been conventionally difficult. With such a configuration, a more appropriate search result (a collation result) is easily obtainable.

Therefore, for example, regarding an individual sound included in an environmental sound, a similar sound can be searched for from the sound source database without separately sampling or recording the sounds.

In addition, the sound is separated into the signals of the individual sound sources in the sound source separation. Therefore, the pitch, the scale, and the like of the designated sound source can be easily estimated at the time of the sound source collation process. With such a configuration, the collation accuracy with the sound source database can be improved.

In particular, even in a case where the melody of the musical instrument desired to be a designated sound source is different from the vocal main melody of the input audio signal, or the like, the information processing apparatus 11 is capable of obtaining the separation signal including only the melody of the musical instrument desired to be the designated sound source, and thus is capable of conducting the collation with high accuracy.

Second Embodiment

<Configuration Example of Information Processing Apparatus>

In a case where a sound source list of sound sources to be candidates for a designated sound source is displayed, by the way, instead of a preset list of the sound sources being displayed, sound source separation is conducted on a target section signal, so that a sound source list of the sound sources actually including sounds in the target section signal may be displayed.

In particular, in the first embodiment, the description has been given with regard to the example in which the identification process of the musical instrument is performed on the target section signal to identify the type of musical instrument, the sound of which is included in the target section signal. However, this identification process may be replaced with the sound source separation.

Figure 10:
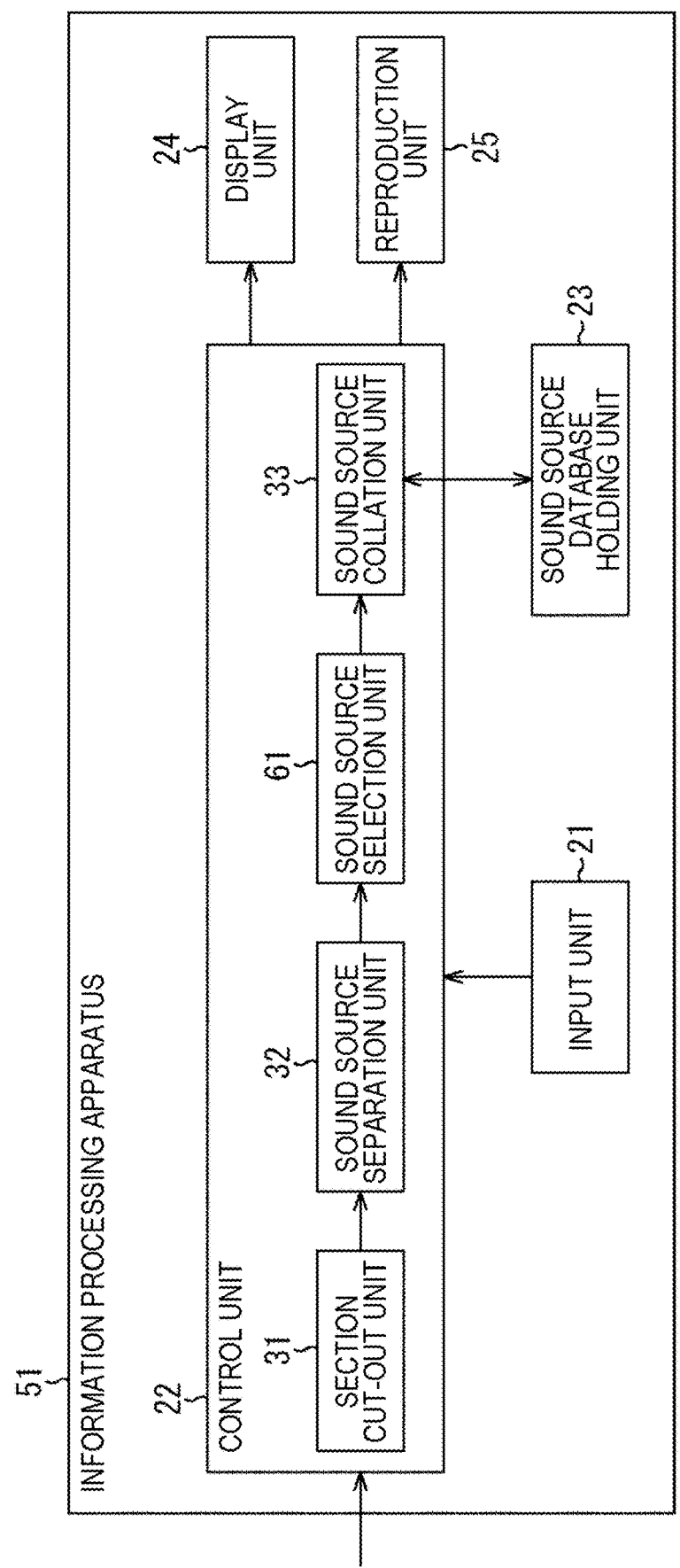
FIG. 10 is a diagram illustrating a configuration example of an information processing apparatus.

In a case of specifying a sound source that actually includes a sound in the target section signal in the sound source separation, the information processing apparatus is configured as illustrated in FIG. 10, for example. Note that in FIG. 10, parts corresponding to those in the case of FIG. 1 are applied with the same reference numerals, and the descriptions will be omitted as appropriate.

An information processing apparatus 51 illustrated in FIG. 10 includes the input unit 21, the control unit 22, the sound source database holding unit 23, the display unit 24, and the reproduction unit 25.

Further, the control unit 22 includes the section cut-out unit 31, the sound source separation unit 32, a sound source selection unit 61, and the sound source collation unit 33.

The configuration of the information processing apparatus 51 is different from the configuration of the information processing apparatus 11 in that the sound source selection unit 61 is newly provided, but is the same with the configuration of the information processing apparatus 11 in the other points.

In the information processing apparatus 51, the sound source separation unit 32 conducts the sound source separation on the target section signal that has been supplied from the section cut-out unit 31, to extract, as the separation signal, a signal of each sound source included in the target section signal from the target section signal, and supplies the sound source selection unit 61 with the separation signals of all the sound sources.

The sound source selection unit 61 selects the separation signal of the designated sound source that has been designated by the control unit 22 from among the separation signals of all the sound sources that have been supplied from the sound source separation unit 32, and supplies the sound source collation unit 33 with the separation signal.

Therefore, in the information processing apparatus 51, after the sound source separation, the designated sound source, that is, the type of sound source to be searched for is selected (designated).

<Description of Sound Source Search Process>

Next, a sound source search process performed by the information processing apparatus 51 will be described with reference to a flowchart in FIG. 11.

Note that the processes in steps S41 and S42 are similar to the processes in steps S11 and S12 in FIG. 2, and thus the descriptions will be omitted.

In step S43, the sound source separation unit 32 conducts the sound source separation on the target section signal that has been supplied from the section cut-out unit 31, separates, as separation signals, signals of all the sound sources included in the target section signal, and supplies the separation signals of the respective sound sources to the sound source selection unit 61.

In step S44, the control unit 22 controls the display unit 24 on the basis of the result of the sound source separation in step S43, and causes a sound source list, which is a list of the sound sources of the respective separation signals that have been obtained by the sound source separation, to be displayed on the display screen.

Figure 12:
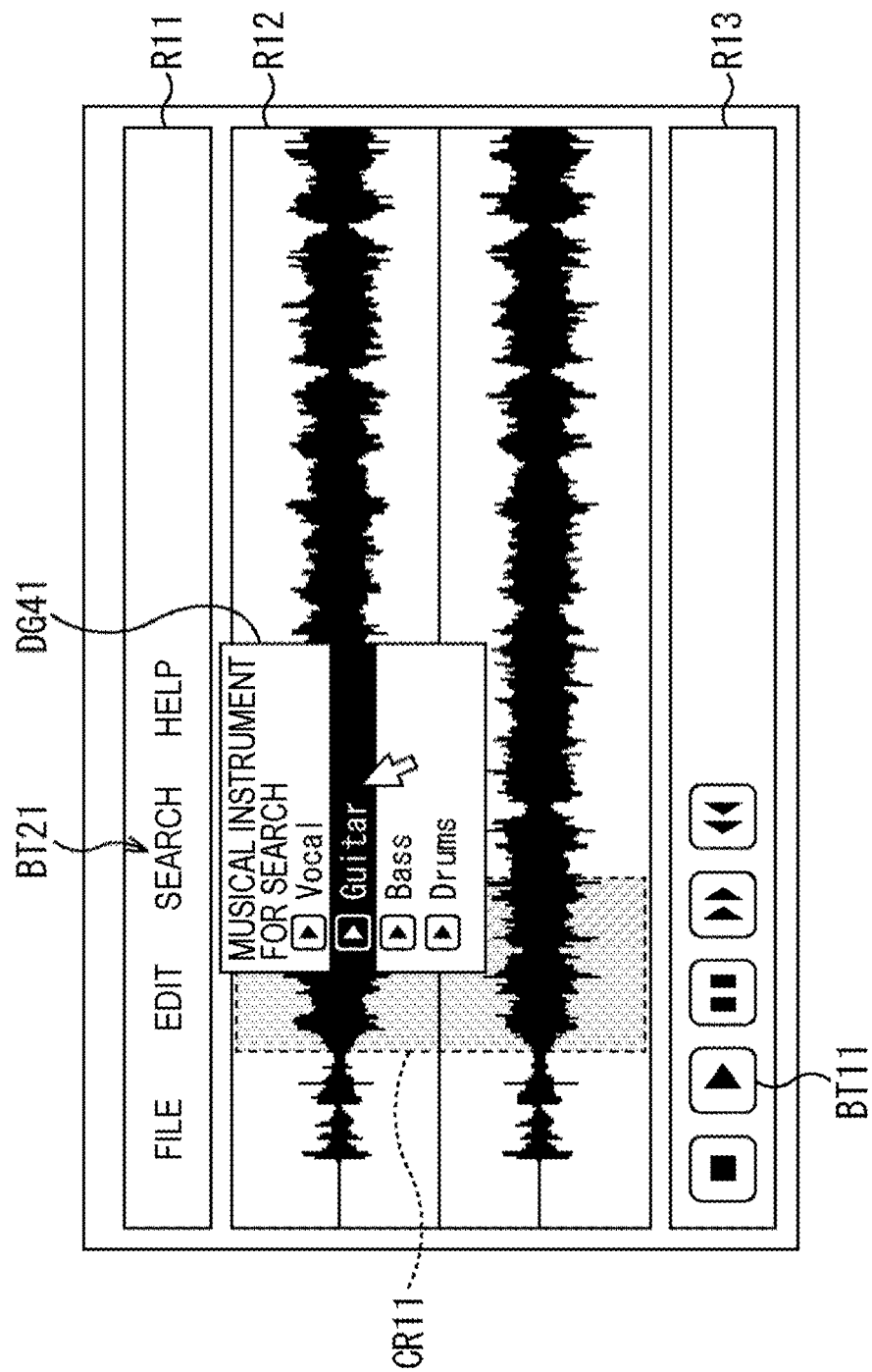
FIG. 12 is a diagram illustrating a display screen example.

With such a configuration, for example, a dialog DG41 illustrated in FIG. 12 is displayed on the display unit 24. Note that in FIG. 12, parts corresponding to those in the case of FIG. 6 are applied with the same reference numerals, and the descriptions will be omitted as appropriate.

In an example of FIG. 12, the dialog DG41 is displayed as a sound source list, and this sound source list is a list of sound sources (the musical instruments) of the respective separation signals that have been separated by the sound source separation.

In particular, here, a vocal "Vocal", a guitar "Guitar", a bass "Bass", and a drum "Drums" are arranged and displayed as names of the musical instruments respectively indicating the sound sources, and a user is able to grasp that the sounds of these sound sources are included in a designated section. Note that regarding a sound source with an unknown name of the musical instrument (the type of sound source), a predetermined name of a musical instrument by which such a situation can be understood is displayed.

Furthermore, in the dialog DG41, reproduction buttons are displayed on the left sides of the respective names of the musical instruments in the drawing, and the user operates these reproduction buttons to be able to reproduce the sound based on the separation signal of each musical instrument (the sound source).

Specifically, for example, when the user operates a reproduction button provided on the left side of the guitar "Guitar" in the drawing, a signal in accordance with the user's operation is supplied from the input unit 21 to the control unit 22.

Then, in response to the signal that has been supplied from the input unit 21, the control unit 22 supplies the reproduction unit 25 with the separation signal of the guitar "Guitar", which is the sound source that has been designated by the user from among the separation signals of the respective sound sources that have been obtained by the sound source separation unit 32, and causes the reproduction unit 25 to reproduce the sound based on the separation signal. With such a configuration, the reproduction unit 25 reproduces only the sound of the guitar in the designated section.

In the information processing apparatus 51, not the type of sound source that has been preset, but the type of each sound source (a musical instrument) that has been obtained as a result of actually conducting the sound source separation on the target section signal is displayed in the dialog DG41, and listening to the sound of each sound source is actually enabled.

Therefore, the user is able to reliably designate a sound source that the user desires, that is, a musical instrument that the user desires to search for.

Figure 11:
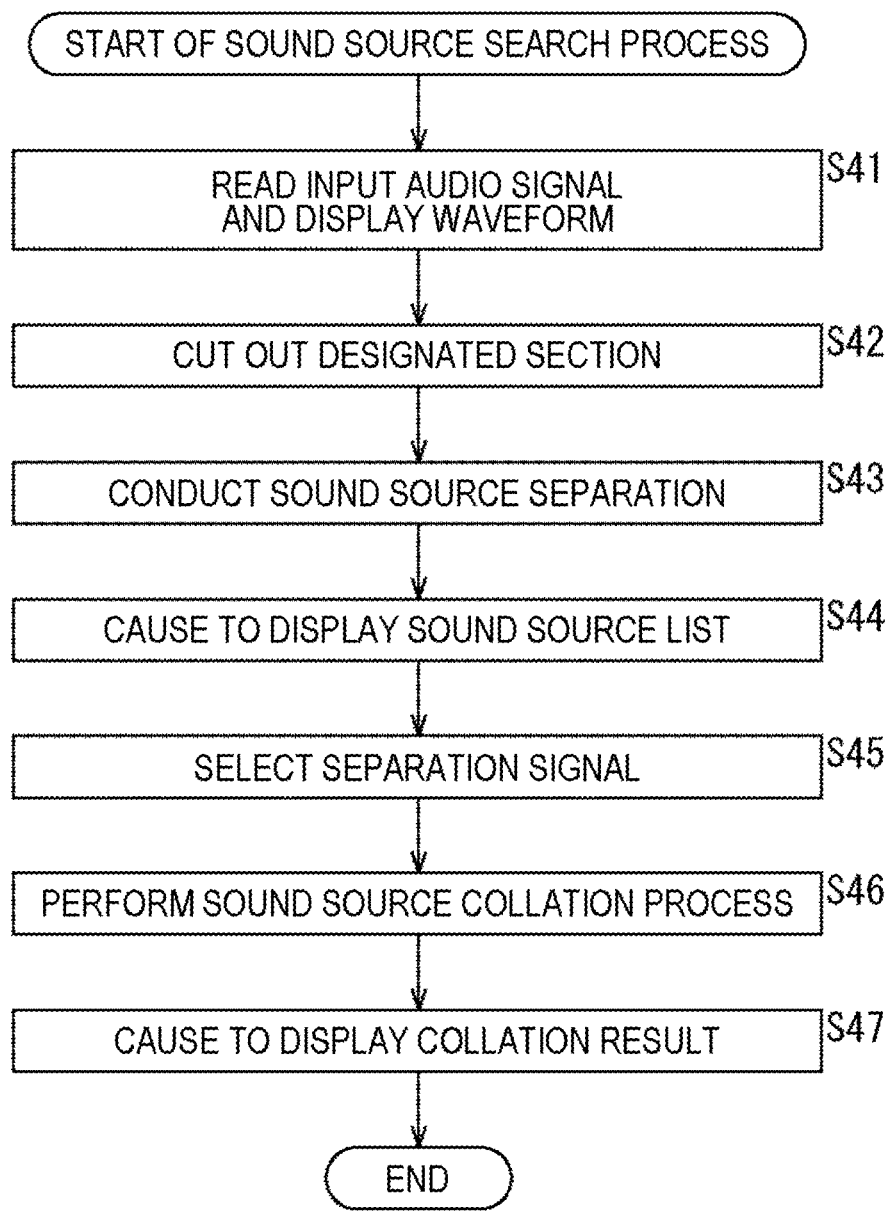
FIG. 11 is a flowchart illustrating a sound source search process.

Returning to the flowchart of FIG. 11, in step S45, the sound source selection unit 61 selects the separation signal of the sound source that has been designated as the designated sound source by the control unit 22 from among the separation signals of the respective sound sources that have been supplied from the sound source separation unit 32, and supplies the sound source collation unit 33 with the separation signal that has been selected.

For example, when the user operates the input unit 21 and designates a sound source that the user desires to be a designated sound source from the sound source list displayed on the display unit 24, a signal in accordance with the user's operation is supplied from the input unit 21 to the control unit 22. Then, the control unit 22 designates the designated sound source for the sound source selection unit 61, in response to the signal that has been supplied from the input unit 21.

The sound source selection unit 61 selects the separation signal of the sound source that has been designated as the designated sound source by the control unit 22 from among the separation signals of the respective sound sources, in response to the designation of the designated sound source by the control unit 22.

The separation signal of the designated sound source is selected in this manner, and then the processes of steps S46 and S47 are performed, and the sound source search process ends. However, these processes are similar to the processes of steps S15 and S16 of FIG. 2, and thus the descriptions will be omitted.

Note that also in step S46, in a similar manner to the case of step S15 in FIG. 2, the sound source collation process may be performed on the basis of the feature amount obtained from the separation signal.

As described above, the information processing apparatus 51, after conducting the sound source separation, selects the designated sound source, and performs the sound source collation process on the basis of the separation signal of the designated sound source.

By configuring in this manner, the search can be conducted more easily and at a higher speed.

In particular, in this example, the sound source list obtained from the sound source separation result is presented to the user, and the designated sound source is designated from the sound source list.

Therefore, even in a case where the type of sound source that has been separated by the sound source separation is unknown in the information processing apparatus 51, the user is able to designate such an unknown type of sound source as the designated sound source. Accordingly, the sound source signal of an appropriate sound source that the user desires is obtainable by a search (collation).

Third Embodiment

<Configuration Example of Information Processing Apparatus>

Furthermore, in order to further reduce a waiting time of the user, the sound source separation may be conducted in background.

Figure 13:
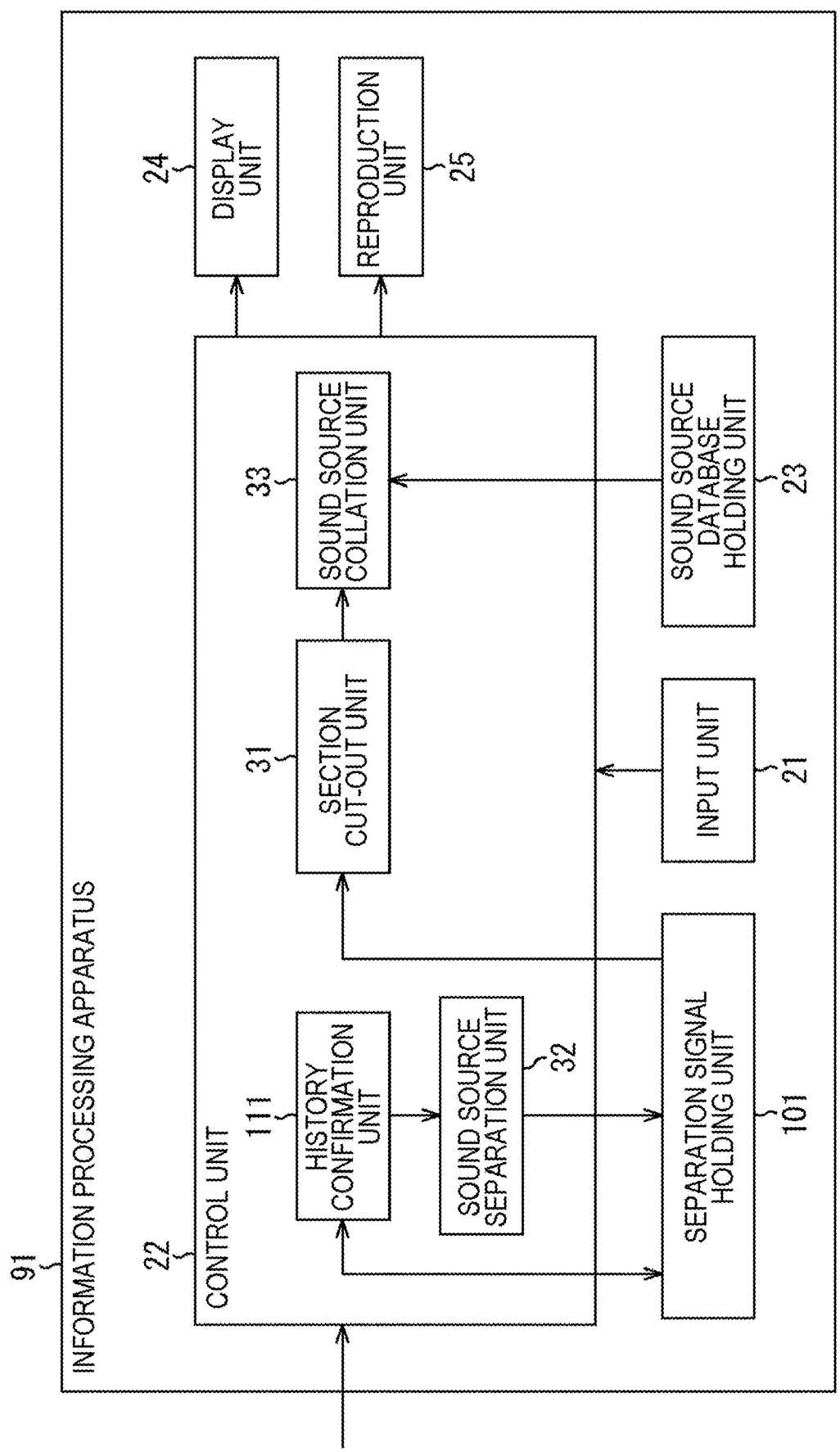
FIG. 13 is a diagram illustrating a configuration example of an information processing apparatus.

In such a case, the information processing apparatus is configured as illustrated in FIG. 13, for example. Note that in FIG. 13, parts corresponding to those in the case of FIG. 1 are applied with the same reference numerals, and the descriptions will be omitted as appropriate.

An information processing apparatus 91 illustrated in FIG. 13 includes the input unit 21, the control unit 22, a separation signal holding unit 101, the sound source database holding unit 23, the display unit 24, and the reproduction unit 25.

In addition, the control unit 22 of the information processing apparatus 91 includes a history confirmation unit 111, the sound source separation unit 32, the section cut-out unit 31, and the sound source collation unit 33.

The configuration of the information processing apparatus 91 is different from the configuration of the information processing apparatus 11 in that the history confirmation unit 111 and the separation signal holding unit 101 are newly provided, but is the same with the configuration of the information processing apparatus 11 in the other points.

The separation signal holding unit 101 includes a storage device such as a memory, for example, and holds (stores) the separation signal that has been obtained by conducting the sound source separation on the input audio signal.

More specifically, in the separation signal holding unit 101, the separation signal that has been obtained by the sound source separation with respect to the input audio signal and the metadata related to the separation signal are held in association with each other. Note that a management file including a content similar to the metadata may be generated, and the separation signal may be managed in the management file.

Here, the metadata of the separation signal includes, for example, information indicating a name of a piece of music of an input audio signal of a separation source of the separation signal, information indicating a sound source of the separation signal, more specifically, the type of sound source (the musical instrument), and the like.

Furthermore, in the information processing apparatus 91, the control unit 22 obtains the metadata of the input audio signal together with the input audio signal.

When the input audio signal and its metadata are obtained, the history confirmation unit 111 specifies whether or not the input audio signal has been read in the past on the basis of the metadata of the input audio signal and the metadata of the separation signal held in the separation signal holding unit 101.

Then, in a case where the input audio signal has not been read in the past, the history confirmation unit 111 instructs the sound source separation unit 32 to conduct the sound source separation on the input audio signal.

<Description of Sound Source Search Process>

Figure 14:
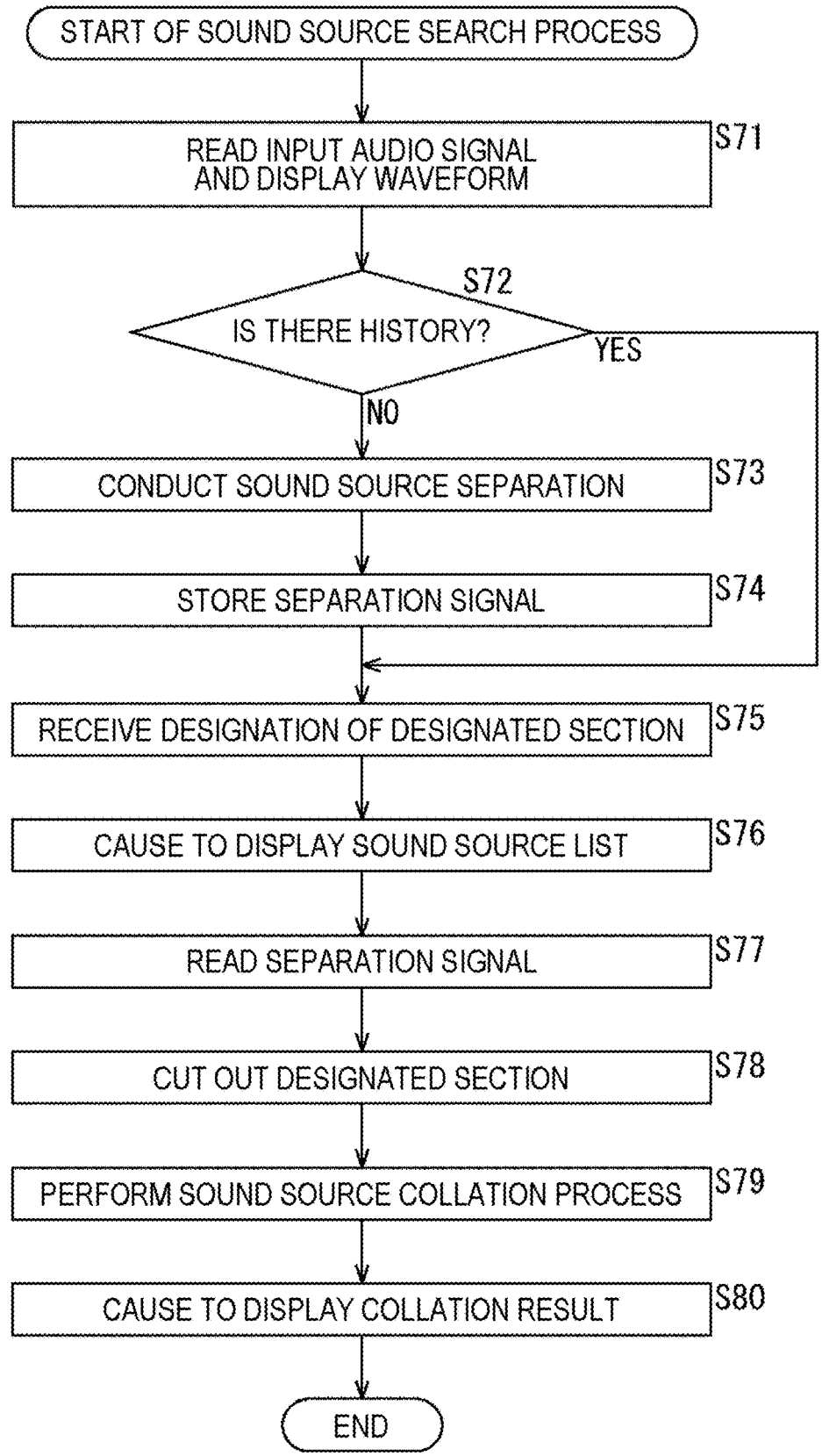
FIG. 14 is a flowchart illustrating a sound source search process.

Next, a sound source search process performed by the information processing apparatus 91 will be described with reference to a flowchart in FIG. 14.

Note that the process in step S71 is similar to the process in step S11 in FIG. 2, and thus the descriptions will be omitted. In step S71, not only the input audio signal such as the piece of music that has been designated by the user but also the metadata of the input audio signal are read.

In step S72, the history confirmation unit 111 determines whether or not there is a history that the input audio signal has been read in the past on the basis of the metadata of the input audio signal that has been read and the metadata of the separation signal held in the separation signal holding unit 101. That is, it is determined whether or not the input audio signal is one that has been read in the past.

For example, in a case where there is the same name of a piece of music with that of a piece of music indicated by the metadata of the input audio signal that has been read in step S71, in the names of pieces of music indicated by the metadata of the respective plurality of separation signals, the history confirmation unit 111 determines that there is a history that has been read.

In a case where it is determined in step S72 that there is no history, the history confirmation unit 111 instructs the sound source separation unit 32 to conduct the sound source separation with respect to the input audio signal that has been read in step S71. Then, the process proceeds to step S73.

In step S73, the sound source separation unit 32 conducts the sound source separation on the input audio signal that has been read by the control unit 22, separates the input audio signal into separation signals for every sound source, and supplies the separation signal holding unit 101 with the separation signals that have been obtained.

In step S73, the sound source separation unit 32 conducts the sound source separation on the entire input audio signal, that is, the entirety of the piece of music.

Then, the sound source separation unit 32 supplies the separation signal holding unit 101 with the separation signal that has been obtained as a result of the sound source separation, and also information regarding each separation signal, such as information indicating the type of sound source, information indicating an audible section of the separation signal, that is, a non-silent section of the separation signal.

In step S74, the separation signal holding unit 101 stores the separation signal that has been supplied from the sound source separation unit 32.

Specifically, the separation signal holding unit 101 obtains the metadata of the input audio signal from the history confirmation unit 111, and generates the metadata of each separation signal that has been supplied from the sound source separation unit 32 on the basis of the metadata that has been obtained and the information regarding the separation signal that has been supplied from the sound source separation unit 32.

For example, the metadata of the separation signal includes various types of information regarding the separation signal, such as information indicating the name of a piece of music, information indicating the type of sound source, and information indicating an audible section.

The separation signal holding unit 101 stores the metadata and the separation signal that have been obtained as described above in association with each other.

The separation signal is separated from the input audio signal and stored in this manner, and then the process proceeds to step S75.

On the other hand, in a case where it is determined in step S72 that there is a history, the separation signal corresponding to the input audio signal has already been stored in the separation signal holding unit 101. Therefore, the processes of steps S73 and S74 are not performed, and then the process proceeds to step S75.

That is, regarding the piece of music that has been read once, the separation signal of every sound source included in the piece of music has already been stored, and the process of the sound source separation or the like is not particularly performed at the time when the piece of music is read the second and subsequent times.

Note that the processes in steps S72 to S74 are performed in background without receiving an instruction from the user or notifying the user of execution of the processes.

In a case where the process of step S74 has been performed or it is determined in step S72 that there is a history, the control unit 22 receives designation of the designated section in step S75.

When the reception of the designated section is started, the user operates the input unit 21 and performs a drag operation or the like as having been described with reference to FIG. 5, for example, to designate the designated section of the input audio signal. With such a configuration, a signal in accordance with the user's operation is supplied from the input unit 21 to the control unit 22.

In step S76, the control unit 22 causes the display unit 24 to display the sound source list on the basis of the signal that has been supplied from the input unit 21, that is, the designated section that has been designated by the user, and the metadata of each separation signal that has been separated from the input audio signal, which is held in the separation signal holding unit 101.

For example, the control unit 22 specifies a separation signal that is audible, that is, not silent within the designated section from among the separation signals that have been separated from the input audio signal that has been read in step S71, on the basis of the metadata of the separation signal of each sound source.

Then, the control unit 22 causes the display unit 24 to display a list of types of sound sources of the separation signal that has been specified, as a sound source list.

With such a configuration, for example, a dialog similar to the dialog DG41 illustrated in FIG. 12 is displayed on the display unit 24 as the sound source list.

When the sound source list is displayed, the user operates a reproduction button as necessary to reproduce a sound based on the separation signal, and designates a desired sound source as a designated sound source from the sound source list.

Then, a signal in accordance with the user's operation, that is, a signal indicating the designated sound source is supplied from the input unit 21 to the control unit 22.

The control unit 22 instructs the section cut-out unit 31 to cut out the designated section with respect to the separation signal of the designated sound source that has been designated by the user in accordance with the signal that has been supplied from the input unit 21. In other words, the control unit 22 designates the designated section and the designated sound source for the section cut-out unit 31.

In step S77, the section cut-out unit 31 reads the separation signal of the designated sound source that has been separated from the input audio signal from the separation signal holding unit 101 in accordance with the instruction of the control unit 22.

In step S78, the section cut-out unit 31 cuts out the designated section that has been designated in step S75 with respect to the separation signal that has been read in step S77, and supplies the sound source collation unit 33 with a signal that has been obtained as a result.

The signal of the designated section of the separation signal of the designated sound source is cut out in this manner, then the processes of steps S79 and S80 are performed, and the sound source search process ends. However, these processes are similar to those in steps S15 and S16 of FIG. 2, and thus the descriptions will be omitted.

As described above, the information processing apparatus 91 conducts the sound source separation in background beforehand, and cuts out the signal of the designated section from the separation signal of the designated sound source on the basis of the designated sound source and the designated section that have been designated by the user, to perform the sound source collation process.

Also by configuring in this manner, similarly to the first embodiment and the second embodiment, the search can be conducted more easily and at a higher speed.

Moreover, in this case, the sound source separation is conducted on the input audio signal that has been read for the first time in background, before the user designates the designated sound source or the designated section, whereas the sound source separation is not conducted on the input audio signal that has been read for the second and subsequent times.

For this reason, in a period from the time when the user designates the designated section or the designated sound source, that is, from the time when the user instructs a search for a similar sound source to the time when the collation result is presented (displayed), the sound source separation is not conducted, and only the sound source collation process is performed. Therefore, the process time can be largely reduced. That is, the waiting time from the time when the user instructs the search to the time when the collation result is presented can be largely reduced.

Fourth Embodiment

<Configuration Example of Sound Source Search System>

In the above, by the way, the description has been given with regard to the example in which all the processes of searching for a similar sound source are performed in a single apparatus, such as the information processing apparatus 11, the information processing apparatus 51, and the information processing apparatus 91. That is, the description has been given with regard to the example in which the sound source search process is performed in a single apparatus.

The sound source search process, however, may be performed by a plurality of apparatuses, for example, by implementing some blocks (modules) constituting the above-described information processing apparatus 11 or the like on a cloud.

In the following, as an example, a description will be given with regard to an example in which some blocks of the information processing apparatus 11 illustrated in FIG. 1 are provided in a server constituting a cloud. However, also in a similar manner, some blocks of the information processing apparatus 51 or the information processing apparatus 91 may be provided in a server.

Figure 15:
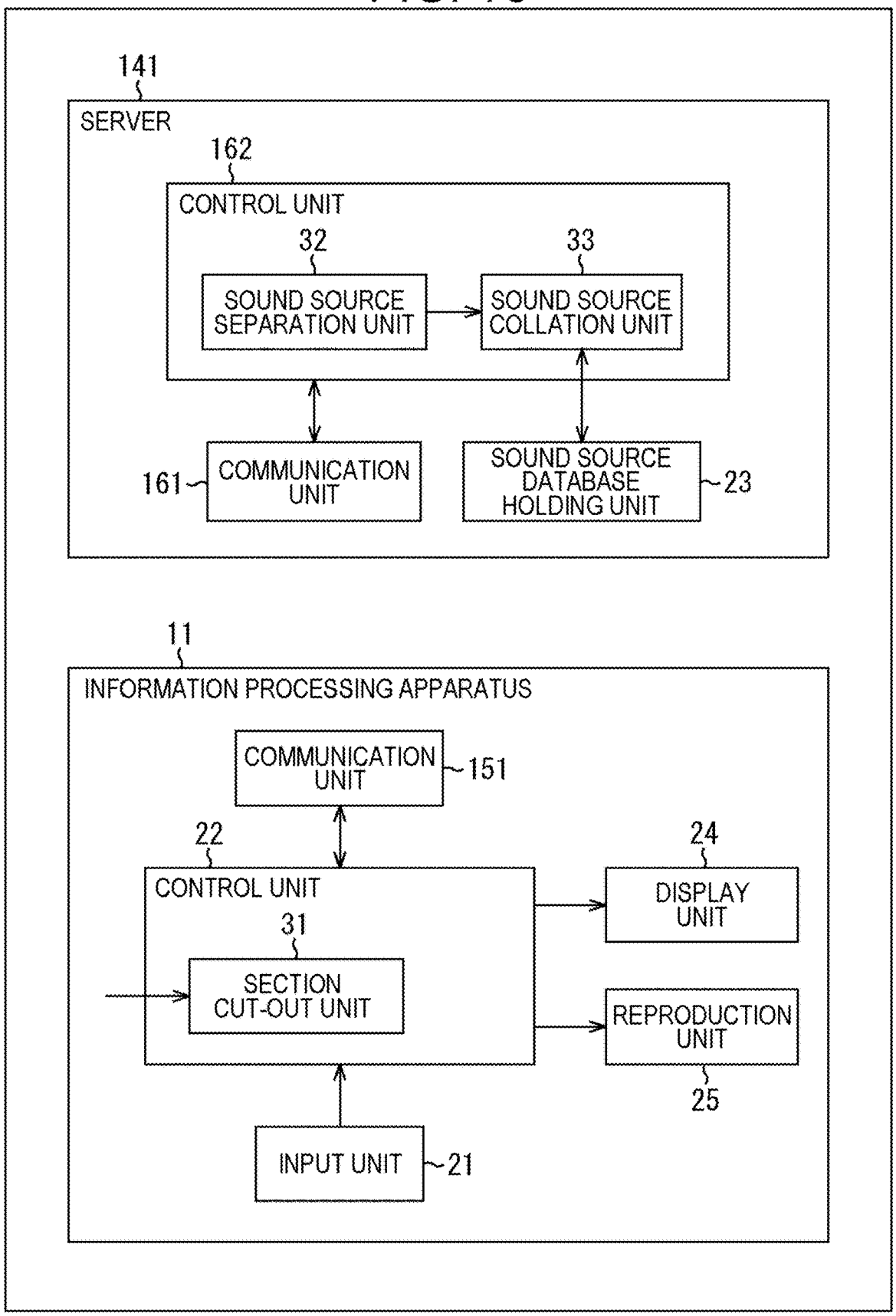
FIG. 15 is a diagram illustrating a configuration example of a sound source search system.

For example, in a case where the cutting out of the designated section of the input audio signal is conducted on the information processing apparatus 11 side, and the sound source separation and the sound source collation process are performed on the server (cloud) side, a sound source search system that performs the sound source search process is configured as illustrated in FIG. 15. Note that in FIG. 15, parts corresponding to those in the case of FIG. 1 are applied with the same reference numerals, and the descriptions will be omitted as appropriate.

In an example illustrated in FIG. 15, a sound source search system includes the information processing apparatus 11 and a server 141.

In this example, the information processing apparatus 11 includes the input unit 21, the control unit 22, the display unit 24, the reproduction unit 25, and a communication unit 151, and the control unit 22 includes the section cut-out unit 31.

Further, the server 141 includes a communication unit 161, a control unit 162, and the sound source database holding unit 23, and the control unit 162 includes the sound source separation unit 32 and the sound source collation unit 33.

In the sound source search system, the information processing apparatus 11 is on an edge side, and the server 141 is on a cloud side.

When the information processing apparatus 11 reads the input audio signal and the user designates the designated section, the section cut-out unit 31 cuts out the signal of the designated section of the input audio signal, and the control unit 22 supplies the communication unit 151 with the target section signal that has been obtained as a result.

Further, when the user designates a musical instrument or the like to be a search target, that is, a designated sound source, the control unit 22 supplies the communication unit 151 with the designated sound source information indicating the designated sound source.

Then, the communication unit 151 transmits the designated sound source information and the target section signal to the server 141, and in the server 141, the communication unit 161 receives the designated sound source information and the target section signal and then supplies the control unit 162 with the designated sound source information and the target section signal.

Furthermore, in the server 141, the sound source separation unit 32 conducts the sound source separation on the basis of the designated sound source information, and separates the separation signal of the designated sound source from the target section signal.

In addition, the sound source collation unit 33 performs the sound source collation process on the basis of the sound source database held in the sound source database holding unit 23 and the separation signal that has been supplied from the sound source separation unit 32.

The control unit 162 supplies the communication unit 161 with the collation result that has been obtained by the sound source collation process and the sound source signal of the sound source that has been obtained as the collation result, and the communication unit 161 transmits, to the information processing apparatus 11, the collation result and the sound source signal that have been supplied from the control unit 162.

Note that here, a description will be given with regard to an example in which the sound source separation and the sound source collation process are performed by a single server 141, However, these processes may be shared and performed by a plurality of servers.

In the information processing apparatus 11, when the communication unit 151 receives the collation result and the sound source signal and then supplies the control unit 22 with the collation result and the sound source signal, the control unit 22 controls the display unit 24 to display the collation result on the display unit 24.

In this case, the main data exchanged between the server 141 and the information processing apparatus 11 include the target section signal and the sound source signal of the sound source in accordance with the collation result.

The above target section signal and the above sound source signal are each short-track of about two seconds to three seconds at the longest, so the data amount is about several tens to several hundreds of kilobytes. Therefore, there is no influence of a delay or the like at the time of transmitting these pieces of data, and the waiting time of the user will not increase.

In the sound source search system as described above, from the user's point of view, there seems no difference from the case where only the information processing apparatus 11 illustrated in FIG. 1 performs the sound source search process.

In a case where the cloud is formed like the sound source search system illustrated in FIG. 15, there are advantages that the sound source separation and the sound source collation process can be performed using higher-performance computing resources, and a larger sound source database is available.

That is, according to the sound source search system in FIG. 15, more advanced computation is quickly enabled, and a larger sound source database is available, regardless of the processing capability or the like of the information processing apparatus 11. An improvement in the work efficiency of the user is enabled.

Modification 1 of Fourth Embodiment

<Configuration Example of Sound Source Search System>

Figure 16:
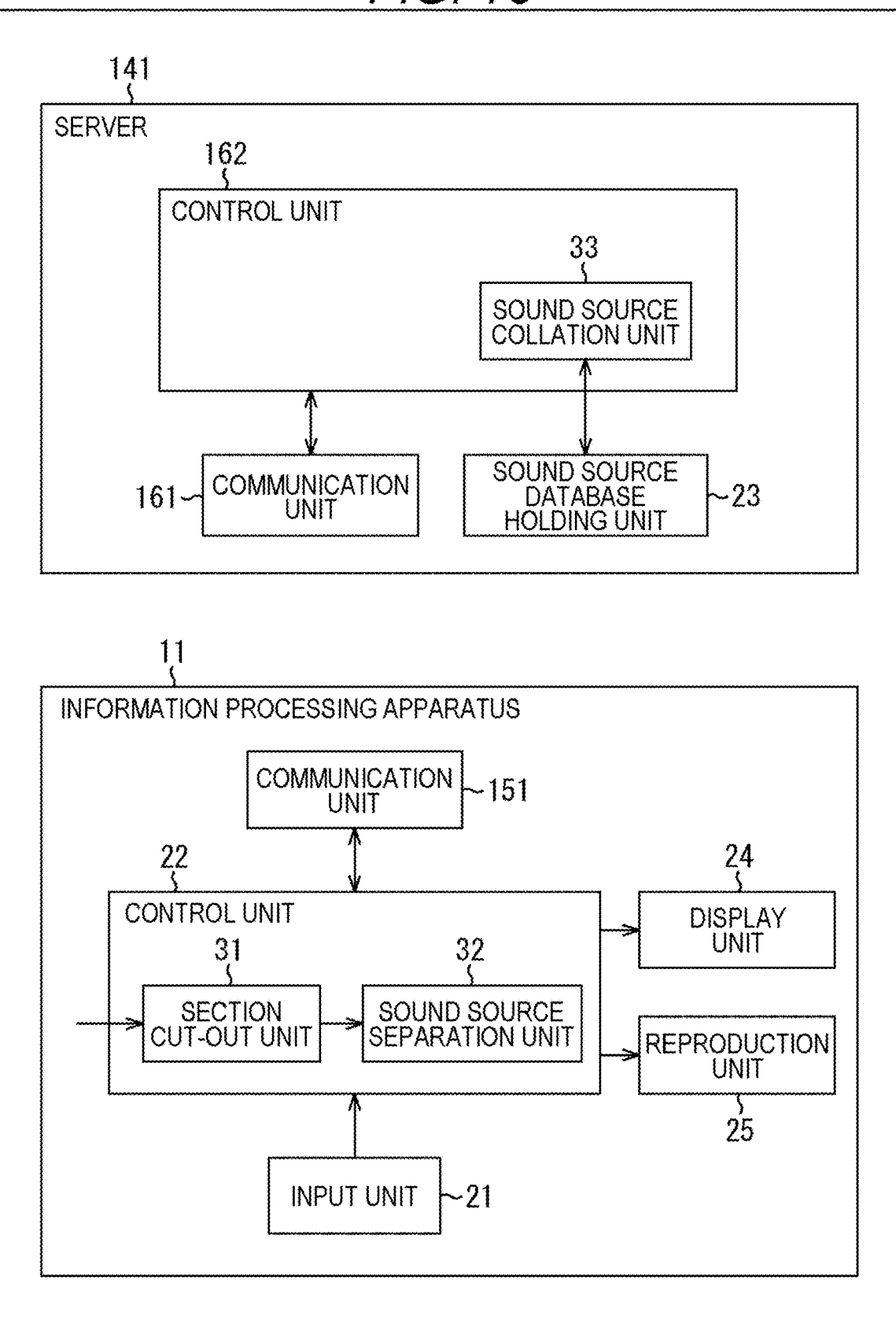
FIG. 16 is a diagram illustrating a configuration example of a sound source search system.

Additionally, for example, as illustrated in FIG. 16, in the sound source search process, the sound source collation process may be performed on the cloud side. Note that in FIG. 16, parts corresponding to those in the case of FIG. 15 are applied with the same reference numerals, and the descriptions will be omitted as appropriate.

The sound source search system illustrated in FIG. 16 includes the information processing apparatus 11 and the server 141.

In this example, the information processing apparatus 11 includes the input unit 21, the control unit 22, the display unit 24, the reproduction unit 25, and the communication unit 151, and the control unit 22 includes the section cut-out unit 31 and the sound source separation unit 32.

Further, the server 141 includes the communication unit 161, the control unit 162, and the sound source database holding unit 23, and the control unit 162 includes the sound source collation unit 33.

Therefore, in this example, the process from cutting out of the designated section with respect to the input audio signal to the sound source separation with respect to the target section signal that has been obtained by cutting out is performed on the information processing apparatus 11 side, and the communication unit 151 transmits, to the server 141, the separation signal of the designated sound source that has been obtained by the sound source separation.

Then, on the server 141 side, when the communication unit 161 receives the separation signal of the designated sound source, the sound source collation unit 33 of the control unit 162 performs the sound source collation process on the basis of the separation signal of the designated sound source. The communication unit 161 transmits, to the information processing apparatus 11, the collation result of the sound source collation process and the sound source signal of the sound source that has been obtained as the collation result.

Modification 2 of Fourth Embodiment

<Configuration Example of Sound Source Search System>

Figure 17:
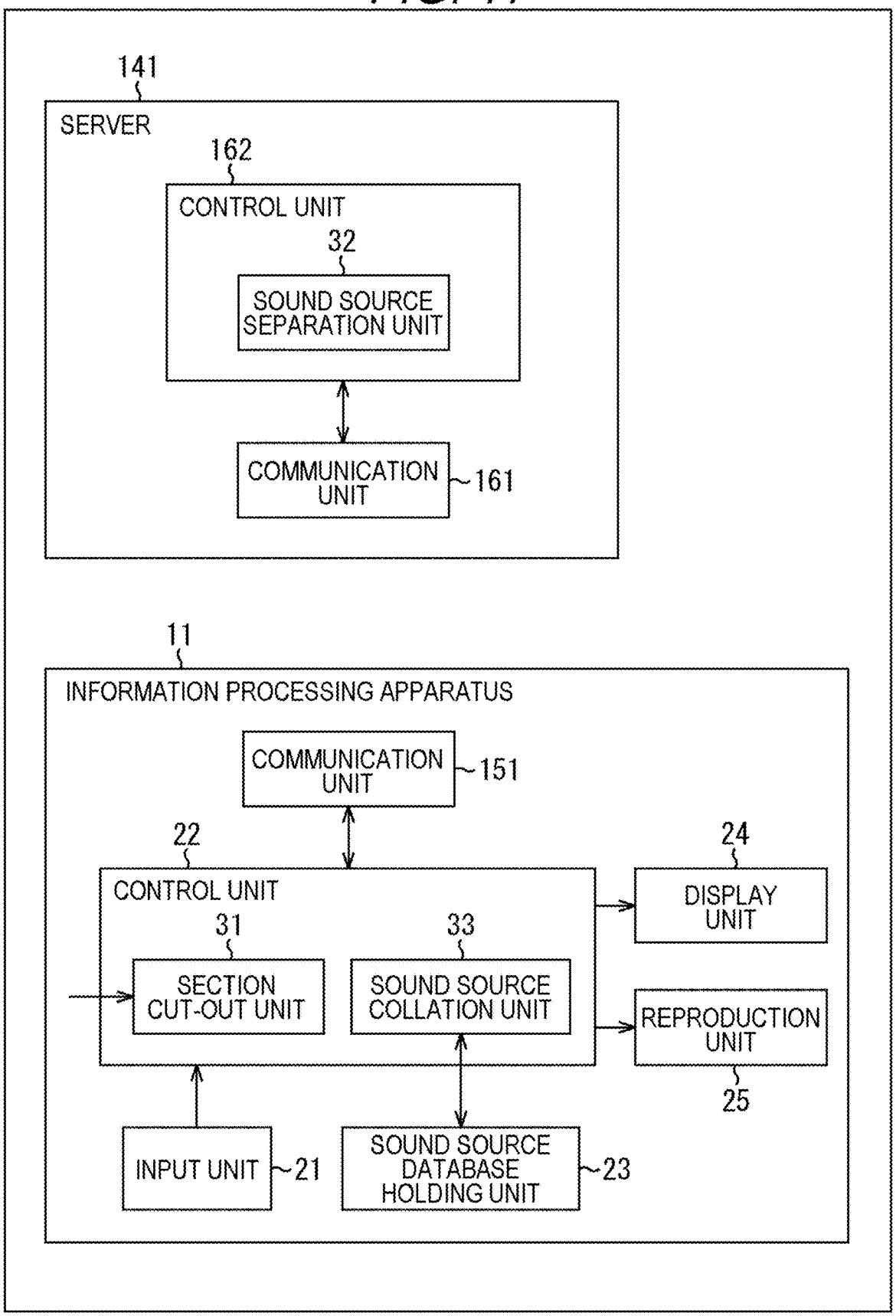
FIG. 17 is a diagram illustrating a configuration example of a sound source search system.

Furthermore, for example, as illustrated in FIG. 17, the sound source separation may be conducted on the cloud side in the sound source search process. Note that in FIG. 17, parts corresponding to those in the case of FIG. 15 are applied with the same reference numerals, and the descriptions will be omitted as appropriate.

The sound source search system illustrated in FIG. 17 includes the information processing apparatus 11 and the server 141.

In this example, the information processing apparatus 11 includes the input unit 21, the control unit 22, the sound source database holding unit 23, the display unit 24, the reproduction unit 25, and the communication unit 151, and the control unit 22 includes the section cut-out unit 31 and the sound source collation unit 33.

Further, the server 141 includes the communication unit 161 and the control unit 162, and the control unit 162 includes the sound source separation unit 32.

Therefore, in this example, first, the information processing apparatus 11 cuts out the designated section with respect to the input audio signal, and the communication unit 151 transmits, to the server 141, the target section signal that has been obtained as a result and the designated sound source information.

Then, in the server 141, the sound source separation unit 32 conducts the sound source separation on the basis of the target section signal and the designated sound source information that have been received by the communication unit 161, and the communication unit 161 transmits the separation signal that has been obtained as a result to the information processing apparatus 11.

Then, in the information processing apparatus 11, the sound source collation unit 33 performs the sound source collation process on the basis of the separation signal that has been received by the communication unit 151 and the sound source database held in the sound source database holding unit 23.

As described above, in a case where the sound source search process is shared and performed by the information processing apparatus 11 and the server 141, flexible administration of the sound source search system is enabled in accordance with the processing capability of the information processing apparatus 11, the scale of the sound source database, and the like.

<Configuration Example of Computer>

The above-described series of processes, by the way, can be performed by hardware, but can also be performed by software. In a case where the series of processes is performed by software, a program constituting the software is installed on a computer. Here, the computer includes a computer incorporated in dedicated hardware, a general-purpose personal computer, for example, capable of carrying out various functions by installing various programs, and the like.

FIG. 18 is a block diagram illustrating a configuration example of hardware of a computer that performs the series of processes that has been described above with a program.

In the computer, a central processing unit (CPU) 501, a read only memory (ROM) 502, and a random access memory (RAM) 503 are connected with one another by a bus 504.

An input and output interface 505 is further connected with the bus 504. An input unit 506, an output unit 507, a storage unit 508, a communication unit 509, and a drive 510 are connected with the input and output interface 505.

The input unit 506 includes a keyboard, a mouse, a microphone, an imaging element, and the like. The output unit 507 includes a display, a speaker, and the like. The storage unit 508 includes a hard disk, a non-volatile memory, and the like. The communication unit 509 includes a network interface and the like. The drive 510 drives a removable storage medium 511 such as a magnetic disk, an optical disk, a magneto-optical disk, or a semiconductor memory.

In the computer configured as described above, the CPU 501 loads, onto the RAM 503, a program stored in the storage unit 508 via the input and output interface 505 and the bus 504, and executes the program to perform the series of the above-described processes.

The program executed by the computer (the CPU 501) can be stored in the removable storage medium 511, which can be supplied, for example, as a package medium or the like. In addition, the program can be also supplied via a wired or wireless transmission medium such as a local area network, the Internet, and digital satellite broadcasting.

In the computer, the removable storage medium 511 is attached onto the drive 510, so that the program can be installed in the storage unit 508 via the input and output interface 505. Further, the program can be received by the communication unit 509 via a wired or wireless transmission medium, and then can be installed in the storage unit 508. Other than that, the program can be installed beforehand in the ROM 502 or the storage unit 508.

Note that the program executed by the computer may be a program to be processed in a time-series order in accordance with the order described in the present specification, or may be a program to be processed in parallel or at a necessary timing such as when a call is made, or the like.

In addition, the embodiments of the present technology are not limited to the above-described ones, and various changes can be made without departing from the gist of the present technology.

For example, the present technology can take a configuration of cloud computing in which a single function is shared by a plurality of devices via networks, and is processed in cooperation.

Further, each step that has been described in the above-described flowcharts can be performed by a single device, or can be shared and performed by a plurality of devices.

Furthermore, in a case where a single step includes a plurality of processes, the plurality of processes included in such a single step can be performed by a single device or shared and performed by a plurality of devices.

Furthermore, the present technology can have the following configurations.

(1)

An information processing apparatus including
a control unit configured to designate a designated section and a designated sound source of an audio signal including sounds of a plurality of sound sources, and configured to obtain a search result of a sound source signal similar to a signal of the designated sound source, the search result of the sound source signal having been searched for on the basis of the signal of the designated sound source in the designated section of the audio signal.

(2)

The information processing apparatus described in (1), in which the signal of the designated sound source includes a separation signal that has been obtained by cutting out the designated section of the audio signal, and sound source separation.

(3)

The information processing apparatus described in (2), in which the signal of the designated sound source includes a separation signal that has been obtained by separating a signal of a sound source that has been designated as the designated sound source from the audio signal by the sound source separation.

(4)

The information processing apparatus described in (3), in which the control unit displays a list of a plurality of candidate sound sources to be candidates for the designated sound source, and designates, as the designated sound source, the candidate sound source that has been designated by a user from among the plurality of candidate sound sources.

(5)

The information processing apparatus described in (2), in which the signal of the designated sound source includes the separation signal that has been designated by a user from among a plurality of the separation signals that has been obtained by the sound source separation.

(6)

The information processing apparatus described in (5), in which the control unit causes a list of sound sources of the plurality of the separation signals that has been obtained by the sound source separation to be displayed, and designates, as the designated sound source, a sound source that has been designated by the user from among the sound sources indicated in the list.

(7)

The information processing apparatus described in any one of (1) to (6), in which the control unit obtains the search result that has been obtained by searching for the sound source signal similar to the signal of the designated sound source from among a plurality of the sound source signals constituting a sound source database.

(8)

The information processing apparatus described in any one of (1) to (7), in which the control unit obtains the search result of the sound source signal similar to the signal of the designated sound source, the search result of the sound source signal having been searched for by collating the signal of the designated sound source with the sound source signal.

(9)

The information processing apparatus described in any one of (1) to (8), in which the control unit controls a display of the search result.

(10)

An information processing method, by an information processing apparatus, including designating a designated section and a designated sound source of an audio signal including sounds of a plurality of sound sources, and obtaining a search result of a sound source signal similar to a signal of the designated sound source, the search result of the sound source signal having been searched for on the basis of the signal of the designated sound source in the designated section of the audio signal.

(11)

A program for causing a computer to execute a process including a step of designating a designated section and a designated sound source of an audio signal including sounds of a plurality of sound sources, and obtaining a search result of a sound source signal similar to a signal of the designated sound source, the search result of the sound source signal having been searched for on the basis of the signal of the designated sound source in the designated section of the audio signal.

REFERENCE SIGNS LIST

11 Information processing apparatus
21 Input unit
22 Control unit
23 Sound source database holding unit
24 Display unit
25 Reproduction unit
31 Section cut-out unit
32 Sound source separation unit
33 Sound source collation unit
61 Sound source selection unit
101 Separation signal holding unit
111 History confirmation unit

The invention claimed is:

1. An information processing apparatus comprising:
processing circuitry configured to:
receive a user selection of a designated section of an input audio signal including sounds of a plurality of sound sources;
receive a user selection of a designated sound source in the designated section of the input audio signal, wherein the designated sound source is selected by the user from a list of candidate sound sources;
perform sound source separation of a separation signal corresponding to the designated sound source from the plurality of sound sources in the designated section of the input audio signal; and
obtain a search result of a sound source signal similar to a signal of the designated sound source, the search result of the sound source signal having been searched for in a sound source database on a basis of the separation signal that has been separated from the designated section of the input audio signal.

2. The information processing apparatus according to claim 1,
wherein the processing circuitry is configured to control display of the list of candidate sound sources to be candidates for the designated sound source, and to designate, as the designated sound source, the candidate sound source that has been selected by the user from among the list of candidate sound sources.

3. The information processing apparatus according to claim 1,
wherein the signal of the designated sound source includes the separation signal that has been designated by a user from among a plurality of the separation signals that has been obtained by the sound source separation.

4. The information processing apparatus according to claim 3,
wherein the processing circuitry is configured to cause a list of sound sources of the plurality of the separation signals that has been obtained by the sound source separation to be displayed, and to designate, as the designated sound source, a sound source that has been designated by the user from among the sound sources indicated in the list.

5. The information processing apparatus according to claim 1,
wherein the processing circuitry is configured to obtain the search result that has been obtained by searching for the sound source signal similar to the signal of the designated sound source from among a plurality of the sound source signals constituting the sound source database.

6. The information processing apparatus according to claim 1,
wherein the processing circuitry is configured to obtain the search result of the sound source signal similar to the signal of the designated sound source, the search result of the sound source signal having been searched for by collating the signal of the designated sound source with the sound source signal.

7. The information processing apparatus according to claim 1,
wherein the processing circuitry is configured to control a display of the search result.

8. An information processing method executed by processing circuitry, the information processing method comprising:
receiving a user selection of a designated section of an input audio signal including sounds of a plurality of sound sources;
receiving a user selection of a designated sound source in the designated section of the input audio signal, wherein the designated sound source is selected by the user from a list of candidate sound sources;
performing sound source separation of a separation signal corresponding to the designated sound source from the plurality of sound sources in the designated section of the input audio signal; and
obtaining a search result of a sound source signal similar to a signal of the designated sound source, the search result of the sound source signal having been searched for in a sound source database on a basis of the separation signal that has been separated from the designated section of the input audio signal.

9. A non-transitory computer readable medium storing instructions that, when executed by processing circuitry, perform an information processing method comprising:
receiving a user selection of a designated section of an input audio signal including sounds of a plurality of sound sources;
receiving a user selection of a designated sound source in the designated section of the input audio signal, wherein the designated sound source is selected by the user from a list of candidate sound sources;
performing sound source separation of a separation signal corresponding to the designated sound source from the plurality of sound sources in the designated section of the input audio signal; and
obtaining a search result of a sound source signal similar to a signal of the designated sound source, the search result of the sound source signal having been searched for in a sound source database on a basis of the separation signal that has been separated from the designated section of the input audio signal.

* * * * *